US005999944A

United States Patent [19]
Lipkin

[11] Patent Number: 5,999,944
[45] Date of Patent: Dec. 7, 1999

[54] METHOD AND APPARATUS FOR IMPLEMENTING DYNAMIC VRML

[75] Inventor: Daniel Lipkin, Belmont, Calif.

[73] Assignee: Oracle Corporation, Redwood Shores, Calif.

[21] Appl. No.: 09/032,099

[22] Filed: Feb. 27, 1998

[51] Int. Cl.[6] .................................................. G06F 17/30
[52] U.S. Cl. .................... 707/104; 345/351; 345/502; 709/206; 709/219
[58] Field of Search ................... 345/351, 502; 709/206, 219; 707/104

[56] References Cited

U.S. PATENT DOCUMENTS

| | | | |
|---|---|---|---|
| 5,675,721 | 10/1997 | Freedman et al. | 345/502 |
| 5,734,795 | 3/1998 | Rogers | 706/45 |
| 5,737,533 | 4/1998 | De Hond | 709/219 |
| 5,808,612 | 9/1998 | Merrick et al. | 345/351 |
| 5,870,549 | 2/1999 | Bobo | 709/206 |
| 5,905,499 | 5/1999 | McDowall et al. | 345/419 |
| 5,918,214 | 6/1999 | Perkowski | 705/27 |

*Primary Examiner*—Paul R. Lintz
*Assistant Examiner*—Mark Terry
*Attorney, Agent, or Firm*—McDermott, Will & Emery

[57] ABSTRACT

Mechanisms and methods for storing, dynamically reconstructing, and navigating a three-dimensional virtual world using a database are disclosed. A virtual world is described in a source text according to the grammar of a modeling language. The source text is read, parsed, and decomposed into a database schema in which characteristics of the world are represented in database tables. In an embodiment, nodes and fields of the world are associated with database queries. When the world is to be displayed, values in the database schema are recomposed into a source text. The database queries are executed against a database, yielding values, in real time based on the current state of the data in the database, for the nodes associated with the queries. Thus, a large virtual world are efficiently displayed and easily modified, and the size, shape, or other aspects of elements of the virtual world can change as data in the database changes.

39 Claims, 10 Drawing Sheets

METHOD AND APPARATUS FOR IMPLEMENTING DYNAMIC VRML

FIELD OF THE INVENTION

This invention generally relates to graphics data processing, and relates more specifically to mechanisms for storing, dynamically reconstructing, and navigating a three-dimensional virtual world using a database system.

BACKGROUND OF THE INVENTION

Computers can generate graphical displays that show an object or scene in three apparent physical dimensions. Such three-dimensional (3D) graphics or images are extremely useful for visualizing real-world objects, scenes, or processes. Systems and software processes for generating 3D graphics are described in detail in W. Newman et al., "Principles of Interactive Computer Graphics" (New York: McGraw-Hill, Inc., 1979).

When polygons, surfaces, and other 3D graphical elements are combined into a computer-generated scene that resembles a real environment, the scene is called a "virtual world" and the computer is said to display "virtual reality". Computer programs are available for defining, editing, and displaying virtual worlds using a personal computer or a graphics workstation.

Recently, a global packet-switched network known as the Internet has attracted wide use. A local computer can connect to a distant server, request a file or an image from the server, and receive the requested information immediately. The Internet operates according to several standard protocols. Packets of data are communicated among Internet host computers ("servers") using the Transmission Control Protocol (TCP) and Internet Protocol. The name and location of each server connected to the Internet is indexed at several computers known as Domain Name Servers (DNSs). A local computer can look up the name of a remote server using a DNS, connect to the remote computer, and send and receive information.

One popular technology enjoying wide use with the Internet is known as the World Wide Web. The World Wide Web enables a computer to locate a remote server using the DNS and then establish a connection to the server and retrieve information using a communication protocol called the Hypertext Transfer Protocol (HTTP). A Uniform Resource Locator (URL) uniquely identifies each page of information stored on the remote server. A URL is a form of network address that identifies the location of information stored in a network. The local computer requests information by providing a request containing a URL of the desired information to the remote server. The server receives the request, locates the page of information corresponding to the URL, and returns the page to the local computer over the HTTP connection. The pages of information are files prepared in the Hypertext Markup Language (HTML). The local computer runs a browser program that can read HTML files, interpret HTML codes in the files, and generate a complex graphical display.

The Virtual Reality Modeling Language (VRML) provides a way to integrate virtual reality technology with World Wide Web technology. VRML is the industry-standard description language for storing and delivering 3D information over the Internet. Using VRML, virtual worlds can be defined in human-readable text form and in a device-independent manner. The virtual world is defined in a text file that is interpreted at runtime, like a scripting language. A complete definition of the VRML language can be found in documents of the VRML organization stored at http://www.vrml.org/, and in other published sources.

Using VRML, a virtual world is defined in a written language in terms of nodes and fields. Nodes are abstractions of real-world objects and concepts. Examples include spheres, lights, and material descriptions. Nodes contain fields and events. Messages may be sent between nodes along routes. Nodes are organized into a representation of a virtual world called a scene graph. A field is a property or attribute of a node. Each type of node has a fixed set of fields. Fields may contain data and one or many values.

In the past, virtual worlds have been stored in a graphical format, such as a bitmap, a set of inter-related sprites, vectors, or other complex numeric information. The text format of virtual worlds defined using VRML uses significantly less storage space than a graphical representation of a virtual world. However, the tradeoff for having less storage is that computation must be performed to transform the VRML text file into an image. As a result, a 3D scene is not rendered and displayed as quickly as it would be if the scene were stored in a graphical representation. As available computing power continues to increase, the processing required to render an image at runtime becomes less significant.

Generally, a VRML virtual world is defined and described in a text file using the VRML language. The browser is provided with a VRML interpreter, generally in the form of a program which can "plug-in" to the browser. An example of a VRML interpreter is the Cosmo browser plug-in available from Silicon Graphics, Inc. VRML worlds are stored on a server. The term "VRML world" or "world" in this context refers both to textual source code and the display resulting from interpretation of the source code by a computer using the VRML interpreter. The browser requests a VRML world by providing its URL to the server. For example, the URL of a VRML world is included in a Web page of a Web site, or associated (as by hyper-linking) with a portion of the Web page. When a user selects or clicks on the hyperlink, the browser sends the URL to the server. The server locates the selected VRML world and returns it in text file format to the local computer. The browser reads the VRML world, interprets the VRML commands, opens a browser window or frame on the computer display, and generates a graphic display. Thus, the server generates the virtual world and the browser renders the world. In this way, virtual worlds can be displayed in a window of a browser.

For example, the following VRML source code will generate a virtual world comprising a red cone when it is run in a VRML-enabled browser:

```
Shape   {
        appearance Appearance {
            material Material {
                diffuseColor 1 0 0
            }
        }
        geometry Cone { }
}
```

This example defines a VRML world that has one "node" called "Shape". The source code of the world defines the "Shape" node as having a particular appearance, apparent material, color, and geometry.

A key advantage of VRML is that the application programmer who writes the VRML world need not write platform-specific code; the same VRML world will run on a personal computer with an Intel® processor, a workstation that has a SPARC® processor, an Apple® Macintosh® computer, or a graphics workstation, provided that a VRML-enabled browser is running.

In general, a VRML world is prepared by writing a text file containing VRML commands, in human-readable source code form, using a general-purpose text editor or a VRML editor such as Silicon Graphics' CosmoSuite or IDS' VRealmsBuilder. A complicated world having numerous shapes or textures may require thousands of lines of VRML code. In the past, such complex VRML worlds have been stored in the form of a single sequential-record text file. To display the world, a VRML-enabled browser loads the entire world as a unit, and then interprets the entire world starting from the top of the source file and proceeding to the bottom. The VRML interpreter then determines what portion of the world is visible from the current point of view "seen" by the browser, and displays that portion of the world.

However, this approach is slow and inefficient. The display screen of the user's computer generally shows only a portion of a world. Accordingly, in a complex world only a small portion of the world may be visible on the display at a particular time. This approach also imposes significant burdens on systems that comprise display stations or "clients" coupled over a network to a server that contains the VRML file. It is inefficient and burdensome on the network to transfer a large VRML file as a complete unit over the network to a display station, when only a portion of the world is within the field of view of the display station.

The conventional approach also may be impractical in a system comprising a server that stores the VRML file and a remotely located display terminal that lacks a large storage device. For example, computing environments are being developed using servers and remotely connected network computers. The network computers have limited memory and lack large storage devices such as disk drives. A large VRML file may exceed the memory storage space available in a network computer, so that the VRML world cannot be displayed.

Another disadvantage of the conventional approach is that the VRML file is monolithic and static. A complicated world defined in a large VRML file is difficult to maintain and update. For example, to make a small change to a world, such as removing a tree from a scene, it would be necessary to: retrieve the entire VRML file; find the portion of the file in which the tree is defined; update the file using a text editor to remove the tree; and save the updated file as a single unit. In addition, the same process of editing, saving, and reloading must be used when the user wishes to add new elements to the world. Manipulating a VRML file in this manner excessively burdens the user and the computing system, and is slow and error-prone.

Database systems are computer programs optimized for creating, storing, manipulating, and reporting on information stored in tables. The tables are organized as an array of rows and columns. The values in a row are associated with each other in some way; for example, a row may store a complete data record relating to a sales transaction, a person, or a project. Columns of the table define discrete portions of the rows that have the same general data format. For example, columns define fields of the records.

Database systems provide a powerful way to organize large amounts of information and retrieve selected information. They operate rapidly and can be applied to real-time data-entry situations in which data is constantly entered, retrieved, and updated. However, in the past, adapting databases to particular applications has been slow and cumbersome, requiring custom code. In addition, database systems generally have limited report-generating capabilities especially with respect to delivering information over the Web. Most data is displayed in tabular reports, or other line-oriented and column-oriented methods. While some database systems provide graphic display capabilities, the displays are usually limited to simple graphs and charts.

In addition, in most database systems, graphs and charts cannot be prepared using rapidly changing data from a database that forms a part of a real-time application. Usually, to generate a graph the user must specify a range of data in a table, and invoke a graph generating utility. While the graph is displayed, changes may occur in the data, but the changes are not reflected in the graph in real time. This limits the usefulness of the graphical display features.

Based on the foregoing, there is a clear need for a system, process and product that provides rapid and efficient creation, modification and updating of a virtual world.

There is a need for a system, process and product that displays a virtual world efficiently and effectively on a remote display device that has limited local storage space.

There is a need for a system or process that allows elements or information to be inserted dynamically into a virtual world while the world is displayed.

There is also a need for a system or process that permits elements of a graphical world to be modified in real time based upon a changing source of data.

There is also a need for a system or process that permits such modification based upon information retrieved in real time from a table of a database management system.

SUMMARY OF THE INVENTION

The foregoing needs, and other needs that will become apparent in the following description, are fulfilled by embodiments of the invention, which comprises, in one aspect, a method of generating a display of a virtual world from a first source definition of the virtual world, the method comprising the steps of (A) storing a description of a node that is defined in the first source definition; (B) storing, in association with a field value of the node in the description, a statement that describes a database operation; (C) executing the statement to generate a data value; (D) delivering a second source definition of the virtual world to a client that is configured to generate the display using the second source definition, in which the second source definition uses the data value for the field of the node.

One feature of this aspect is that step (B) includes the step of storing, in association with the field value, a Structured Query Language (SQL) statement configured to carry out the database operation on the database. A related feature is that step (B) further comprises the steps of storing a PL/SQL procedure in a server with which the client interacts; and storing a PL/SQL function call in association with the field. Another feature is that step (B) includes the steps of declaring a variable; and storing the variable in association with the statement.

Still another feature is that step (D) includes the step of providing a value of the variable to the statement when the virtual world is displayed. A related feature is that step (D) includes the step of providing a value of the variable to the statement when the statement is executed.

According to another feature, the method further comprises the steps of selecting the field value of the virtual world; defining the statement to generate a custom node associated with the field value when the statement is executed; and storing the statement in association with the field value. In a related feature, the step of storing a statement includes the step of defining a PL/SQL procedure configured to generate the custom node; and the step of storing the statement includes the step of storing a PL/SQL function call corresponding to the PL/SQL procedure in association with the field value. In another feature, the method further comprises the steps of selecting the field value; storing information that identifies a second virtual world in association with the field value.

In another feature, the method further comprises the steps of reading a second node from the second virtual world; and storing a second node description of the second node in association with the field value. Still another feature involves the steps of reading a Virtual Reality Modeling Language (VRML) definition of the second node from a source code file; and converting the VRML definition into the second node description. In yet another feature, the step of storing a statement comprises the steps of selecting the node, the field value, and an element of the field value; defining the statement to yield the data value for the field value when the statement is executed; and storing the statement in association with the element.

Another feature involves defining a variable parameter in association with the statement; and at the client, supplying a variable value to the variable parameter when the second source definition is delivered to the client.

The invention also encompasses other aspects. Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

Mechanisms for storing and dynamically reconstructing a three-dimensional world is described. In the following description, for the purposes of explanation, numerous specific details are set forth in order to provide a thorough understanding of the present invention. It will be apparent, however, to one skilled in the art that the present invention may be practiced without the specific details. In other instances, well-known structures and devices are shown in block diagram form in order to avoid unnecessarily obscuring the present invention.

INCREMENTALLY GENERATING A GRAPHICAL WORLD

Conventionally, VRML worlds are defined in VRML source files. The structure of VRML source files as defined by Release 2.0 of VRML is described in public documents of the VRML organization, including "The Virtual Reality Modeling Language," ISO/IEC DIS 14772-1, http://www.vrml.org/VRML97/DIS/, and third party manuals as C. Marrin, "Teach Yourself VRML 2.0 in 21 Days" (Indianapolis: Sams Net, 1997).

Standard VRML source files have four major parts. A header identifies the file as a VRML file. A scene graph provides definitions of numerous nodes that make up the substance of the world. "Prototypes" extend the definitions of standard VRML node types. An event routing section describes what should be displayed when events, such as mouse clicks, occur while a world is being viewed.

Nodes in the scene graph are defined according to a grammar. Each node may have a type name (such as Box, Color, Sphere, and others), zero or more "fields" that define how each node differs from other nodes of the same type, a set of events that the node can receive and send, an implementation that defines how it reacts to the events, and a name.

In an embodiment of the invention, a storage mechanism reads a VRML source file, parses the source text to identify nodes, fields, and other elements, and stores the elements that define the world in a database. This process, which is described further below, is called decomposing a VRML world.

Figure 1:
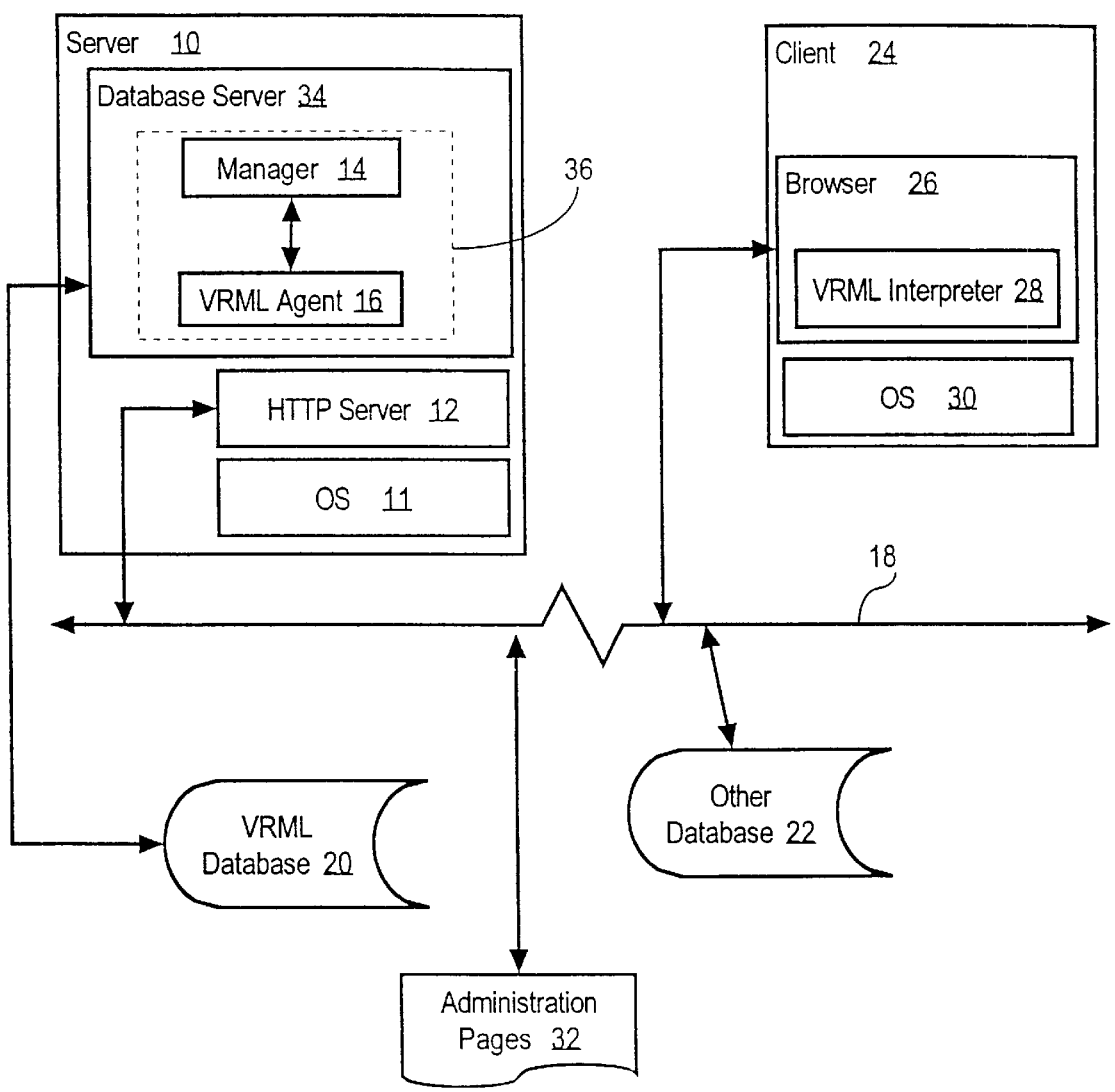
FIG. 1 is a block diagram of a system context in which the present invention can be used.

FIG. 1 is a block diagram showing a computer system context in which an embodiment of the invention can be used. A server is connected over a network 18 to a client 24. The server and client 24 are computers configured such that the client periodically requests information from the server, which supplies it to the client. The server 10 runs an operating system 11 that is responsible for low-level control of the server hardware and its peripheral devices. Preferably the server 10 is a Web server. The server 10 runs an HTTP server program 12 under control of the operating system 11. The HTTP server program 12 enables the server 10 to communicate over the network 18 using the Hypertext Transfer Protocol.

The server 10 also runs a database server 34 under control of the operating system 11. The database server 34 is a general-purpose database system, preferably the Oracle 8 Server system that is commercially available from Oracle Corporation, Redwood Shores, Calif. The database server 34 has a component or cartridge 36 that comprises a manager application program 14 and a VRML Agent 16. In this context the term "cartridge" refers broadly to any software element or group of elements that can work in association with a database server.

The manager application program 14 makes use of the VRML Agent 16. The VRML Agent 16 is a computer program, configured as a standalone process, a dynamically loaded library (DLL), subroutine, or other module such that its functions are accessible to the manager application program 14 by function call or the like.

Text files defining VRML worlds are stored on the server 10 using a file system integral to the operating system 11. The server 10 is coupled to and can access a VRML database 20 that stores virtual worlds in the form of decomposed VRML files. The server 10 also can access an external database 22 of information, such as values usable in a virtual world image constructed using the VRML files. The database 22 can be located within the server 10 or can be accessed over the network 18.

The client 24 runs an operating system 30 that controls its hardware components and coordinates operation of application programs in the client. One of the application programs controlled by the operating system 30 is a browser 26. With assistance from the operating system 30 or a network device driver component, the browser 26 can communicate over the network 18 using the HTTP protocol to request, receive, and display Web pages or other resources defined in the HTML language.

The browser 26 has a VRML interpreter 28. Using the VRML interpreter 28, the browser 26 can request, receive, and display a virtual world that is stored in the server 10 or the VRML database 20, and that is defined in the VRML language. Generally the virtual world is received at the client 24 and VRML interpreter 28 in the form of a text file that stores lines of VRML source code. The VRML interpreter 28 opens the file, reads each line of source code, interprets the source code, and commands the browser 26 or the operating system 11 to display an appropriate image. Preferably, the VRML interpreter 28 can interpret source code confirming to the VRML 2.0 language specification. The VRML interpreter 28 can be an integral part of the browser 26 or it can be a plug-in, add-on, or other separate program that runs in coordination with the browser 26.

Preferably the browser 26 also has a Java interpreter that can receive and execute Java language applets stored on the server 10.

Administration pages 32 are stored so as to be accessible by the client 24. Preferably the administration pages 32 are a set of Web pages, stored in association with the server 10, that provide a way for the client 24 to access administrative functions of the cartridge 36.

DATABASE SCHEMA

Figure 2A:
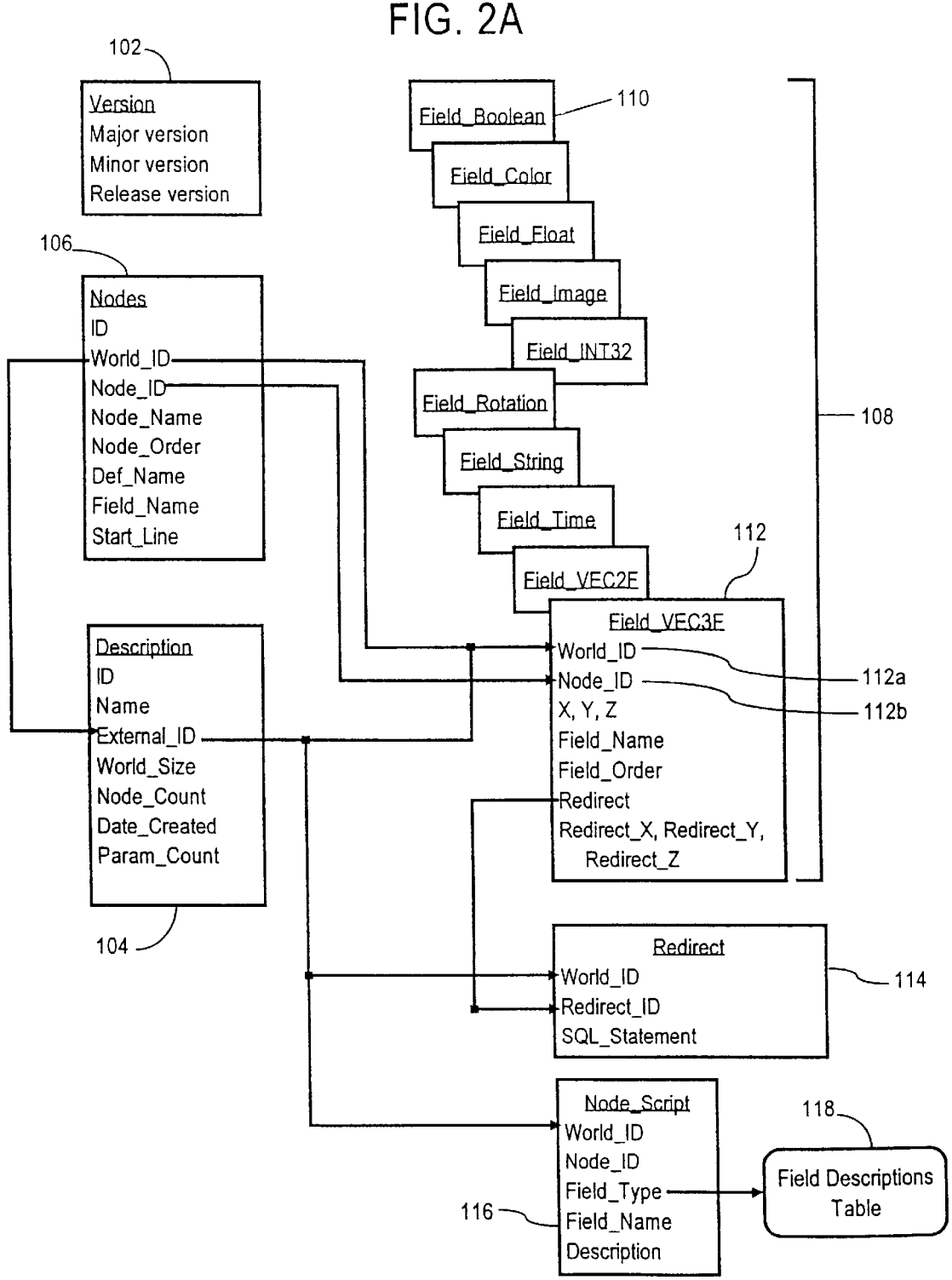
FIG. 2A is a block diagram of a portion of a database schema that can be used in the present invention.
Figure 2B:
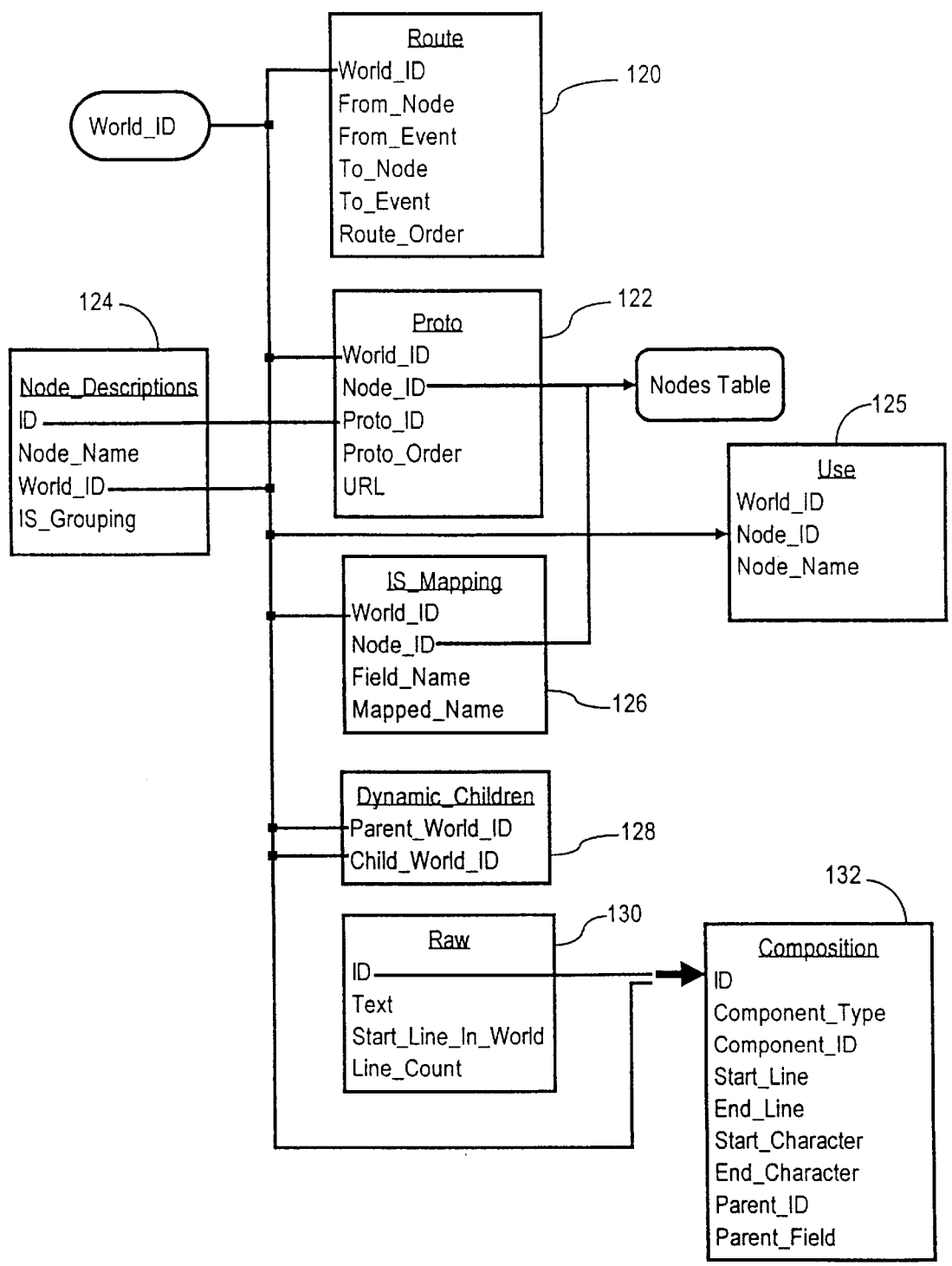
FIG. 2B is a block diagram of additional portions of the database schema of FIG. 2A.
Figure 2C:
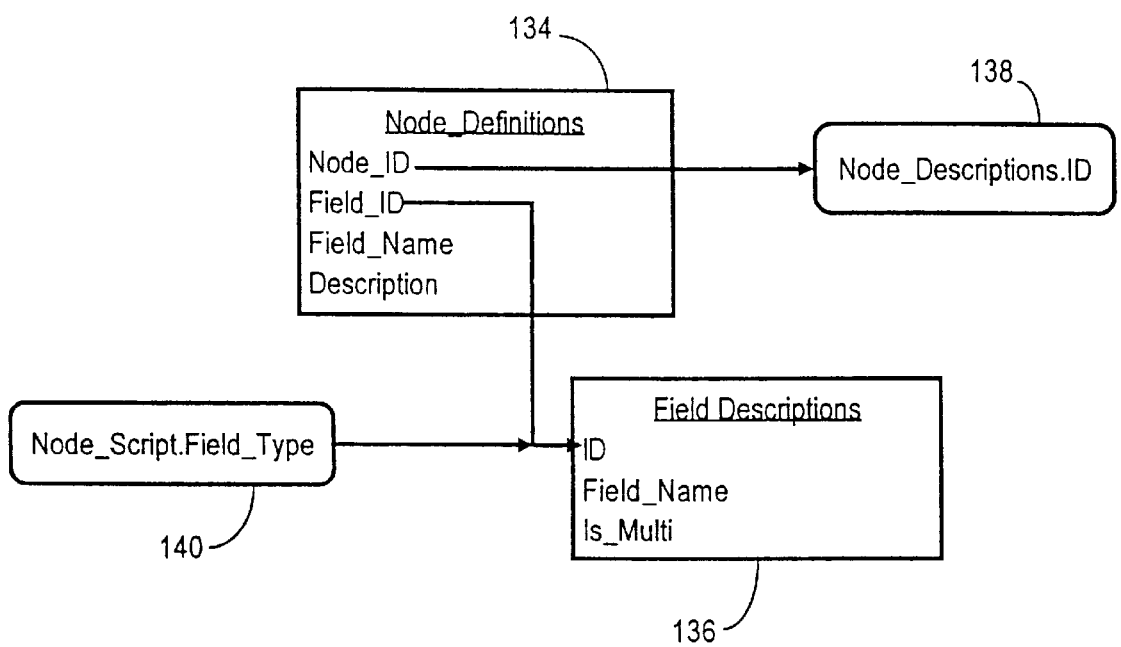
FIG. 2C is a block diagram of additional portions of the database schema of FIG. 2A.

FIG. 2A, FIG. 2B, and FIG. 2C provide block diagrams of a database schema that can be used in an embodiment. In the preferred embodiment, the schema comprises tables, each of which is established in the database 20 and managed by the database server 34.

As discussed further below, in an embodiment, elements execute on the client 24 and on the server 10. It is undesirable for client elements to be incompatible with server elements. Accordingly, the client and server elements are assigned a version identifier, and the schema includes a Version table 102 that stores version identification information. As shown in FIG. 2A, in one embodiment the Version table 102 has columns that store a major version identifier, a minor version identifier, and a release version identifier. The storage mechanism reads the version identifiers stored in the client and the contents of the Version table 102. If the identifiers do not match, the storage mechanism raises an exception or otherwise signals an error condition.

Other tables in the schema shown in FIG. 2A will be discussed in connection with an exemplary VRML world having the source text shown in Table 1. The world defined in Table 1 consists of a simple hut comprising a conical roof on a cylinder.

TABLE 1

EXAMPLE VRML WORLD

```
#VRML V2.0 utf8
Shape   {
        appearance Appearance {
                material Material { }
        }
        geometry Cylinder {
                radius 2
        }
}
Transform {
        translation 0 2 0
        children {
                Shape   {
                        appearance Appearance {
                                material Material { }
                        }
                        geometry Cone {
                                bottomRadius 2.5
                        }
                }
        }
}
```

In the world of Table 1, the line beginning with "#VRML" is the header. The rest of the world is a scene graph; this exemplary world has no proto or route portions.

DESCRIPTION TABLE

As shown in FIG. 2A, a world Description table 104 stores basic information about each world that is defined in the database 20. Each row of the Description table 104 is associated with a world. For each world, the Description table 104 has columns that store an ID, Name, External ID, World Size, Node Count, Date Created, and Parameter Count. The ID column stores a unique identifier for the world represented by a row. Preferably, identifiers for the ID column are generated by a sequence mechanism of the database server 34. The Name column stores a descriptive name of the world. The External ID column stores a unique identifier for the world that can be referenced by other tables and processes of the mechanisms. In other tables, External ID values are called "World ID" values, and are used as a primary key for lookups in the other tables.

The World Size column stores the size of the world in bytes. The generating mechanisms described herein use the World Size value to determine whether sufficient memory and other storage can be allocated when a world is used or rendered. The Node Count column stores a number indicating the total quantity of nodes in the world. The Date Created column stores a date value indicating when the world was created.

The Parameter Count column stores a value indicating the number of parameter names that are within the dynamic Structured Query Language (SQL) statements associated with the world. The syntax of the URL used to generate the VRML is slightly different depending on whether or not there are parameters. Accordingly, the value of the Parameter Count column identifies which URL syntax is to be used in a statement. The addition of dynamically generated data to a stored world, using SQL statements, is described further below.

When the world of Table 1 is processed using the mechanisms described herein, the Description Table 104 stores the values shown in Table 2.

TABLE 2

"SIMPLE HUT" DESCRIPTION TABLE

| ID | Name | Ext. ID | Node Count | Date Created | Parameter Count |
|----|------|---------|------------|--------------|-----------------|
| 1  | Simple Hut | 56 | 9 | 01 Jan 1997 | 0 |

NODES TABLE

A Nodes table 106 stores basic information about every node of every world that is defined in the system. Each row of the Nodes table 106 stores information about one node, and each row is uniquely associated with one node of one world. Multiple nodes in the Nodes table 106 can have the same name provided that each is associated with a different world.

The Nodes table 106 stores node information in columns named ID, World ID, Node ID, Node Name, Node Order, Def Name, Field Name, and Start Line. The ID column stores a unique identifier value associated with a row of the Nodes table 106. In an embodiment, the ID column is a primary key of the Nodes table 106 so that nodes can be located in the table by a lookup keyed to the ID value.

The World ID column stores a numeric value that identifies either a world or a node. Generally, at least one row in the Nodes table 106 has a World ID that corresponds to one of the External ID values stored in the Description table 104. Thus, at least one row of the Nodes Table 106 references a world described in the Description table 104. All nodes within that world have World IDs in the Nodes table 106 that are assigned in a sequentially ascending order based upon the External ID of the world in the Description table 104. For example, if the Description table 104 stores a description of a world that has an External ID value of 56, then the World Ids of nodes of that world defined in the Nodes table 106 will be 57, 58, 59, and so forth.

The Node ID column stores an identifier uniquely associated with a node. The Node Order column stores a value that indicates the order of multiple child nodes that are associated with a world or a parent node. The Def Name column stores the DEF name of the node, if any. In VRML syntax, the DEF keyword is used to assign an identifying name to a node.

The Field Name column stores the name of a field associated with the parent node of the current node. For example, in the example given above, the field name for the "Appearance" node is "appearance" and the field name for the "Cylinder" node is "geometry." The Start Line column stores a numeric value indicating the line position within the VRML source text file at which the definition of the node begins. Thus, the Start Line column provides a logical pointer back to the original source file so that the node can be reconstructed if necessary. This feature is also used for combining dynamic output with a cached copy of the original static text, providing a useful performance improvement.

Table 3 shows values stored in the Nodes table for the "Simple Hut" world defined in Table 1:

TABLE 3

"SIMPLE HUT" NODES TABLE VALUES

| Id | World ID | Node ID | Node Name | Node Order | Def Name | Field Name |
|----|----------|---------|-----------|------------|----------|------------|
| 1 | 56 | 57 | Shape | 1 | | |
| 2 | 56 | 58 | Transform | 2 | | |
| 3 | 57 | 59 | Appearance | 1 | | appearance |
| 4 | 57 | 1  | Cylinder | 2 | | geometry |
| 5 | 59 | 1  | Material | 1 | | material |
| 6 | 58 | 60 | Shape | 1 | | children |
| 7 | 60 | 61 | Appearance | 1 | | appearance |
| 8 | 60 | 1  | Cone | 2 | | geometry |
| 9 | 61 | 1  | Material | 1 | | material |

It will be apparent from the example values in Table 3 that the World ID and Node ID columns of the Nodes table enable nodes in a world to be interrelated. The Nodes table provides a flattened representation of a tree of nodes that make up a world. For example, the Shape node has a World ID of 56 and a Node ID of 57. Its two child nodes, Appearance and Cylinder, each have a World ID of 57. Thus, child nodes are related to a parent node by assigning the same value to the World ID of the child nodes as to the Node ID of the parent node. The Node Order value provides an order for nodes that have the same World Id.

FIELD TABLES AND REDIRECT TABLE

The VRML 2.0 language definition specifies ten pre-defined field types. The field types are Boolean, Color, Float, Image, Int32, Rotation, String, Time, Vec2F which represents a two-dimensional vector of floating point values, and Vec3F which represents a three-dimensional floating point vector. The embodiment shown in FIG. 1 has a plurality of Field tables 108. Each Field table corresponds to one of the pre-defined VRML fields. For example, the database has a Field Boolean table 110 that stores values of all the Boolean fields that are defined in a world. As another example, the database also has a Field Vec3F table 112 that stores values of all the Vec3F fields that are defined in a world.

Each row in a Field table 108 is associated with one field definition in a world. The columns of the Field tables 108 describe that field. Each of the Field tables 108 has columns that store a World ID value 112a, a Node ID value 112b, a Field Name value, a Field Order value, one or more other substantive values that vary depending on the nature of the field, and one or more Redirect values.

The World ID column 112a of each Field table 108 indicates the world with which the field is associated. The Node ID column 112b indicates the node of that world with which the field is associated.

The Field Name column stores the name of the field as defined by the type of node. For example, the VRML language definition specifies that Color fields can have values of "diffuseColor", "emissiveColor", or "specularColor". Accordingly, for a field of type Color within a "Material" node, the Field Name column stores either "diffuseColor", "emissiveColor", or "specularColor". All field tables 108 have a Field Name column even for fields that are known to occur only once in a given node. This is done to support proto nodes, which may have multiple fields of the same type in a given node.

The Field Order column stores a value indicating the order of multiple nodes within a field. Only fields that can be of the type SFNode or MFNode have the Field Order column in the corresponding field table 108. As disclosed in the VRML specification; fields that are of type SFNode store one other node, and fields of type MFNode store a plurality of other values.

The number and type of columns that store substantive values depend on the nature of the field. For example, the Field Boolean table 110 has a single column called Value that stores a one-bit value indicating whether the field is True or False. The Field Vec3F table 112 has three columns named X, Y, and Z, each of which stores a floating-point number representing one coordinate of the point in 3D space represented by the field. Table 4 below lists each Field table 108 and the columns that store substantive values for fields represented in that table.

TABLE 4

SUBSTANTIVE VALUES OF FIELD TABLES

| TABLE NAME | COLUMN NAME(S) | COLUMN CONTENTS |
|---|---|---|
| Field Boolean | Value | Boolean value True or False |
| Field Color | R | Each column stores an integer value indicating |
|  | G | the magnitude of red, green, and blue |
|  | B | components of a color |
| Field Float | Value | Floating point numeric value |
| Field Image | Width | Each column stores a numeric value indicating |
|  | Height | the width, height, number of components, and |
|  | Components | binary values of pixels, respectively, in an image |
|  | Pixels |  |
| Field Int32 | Value | 32-bit integer numeric value |
| Field Rotation | X | The X, Y, and Z columns store numeric values |
|  | Y | that represent coordinates of a point around |
|  | Z | which an object is to be rotated. The Angle |
|  | Angle | column stores a number indicating the angle of rotation in radians. |
| Field String | Value | Text string value |
| Field Time | Value | Time value in seconds |
| Field Vec2F | X | Columns store numeric values that represent |
|  | Y | coordinates of a point in 2D space |
| Field Vec3F | X | Columns store numeric values that represent |
|  | Y | coordinates of a point in 3D space |
|  | Z |  |

The Redirect column indicates whether a substantive value of a Field table 108 should be generated dynamically by applying a SQL statement to a database rather than taking the value from a column of the Field table itself. When the value of the Redirect column is null, then the substantive value is stored in the Field table column.

A non-null value in the Redirect column references the Redirect ID column of a Redirect table 114. Each row of the Redirect table 114 represents a redirection, or an indication that a value for the field is to be obtained from the result of applying a SQL statement to a database. The Redirect table 114 has columns named World ID, Redirect ID, and SQL Statement. The World ID column references the External ID of a world defined in the Description table 104. The Redirect ID column stores a unique identifier of the redirection represented in a row of the Redirect table 114. Preferably, each Redirect ID is generated using a sequencing facility of the database server 34. The SQL Statement column stores the text of a SQL statement that is to be applied to a database in order to result in a substantive value.

Thus, the Redirect column of the Field tables 108 and the Redirect table 114 provide a way to pull values of fields dynamically from an external database that is being updated as a VRML world is being rendered and used.

As an example, a VRML world comprises a 3D bar graph in which each bar represents the current price of a stock traded in a stock market. Stock prices are supplied over a data feed to the database 22, and the prices are updated in the database in real time as market conditions change. The bar graph can be made dynamic using the redirection mechanism. Bars in the bar graph are defined using a Float field to store the height of the bar. A SQL statement is defined that will retrieve a stock price from the database 22, and the text of the statement is stored in the SQL Statement column of the Redirect table 114, associated with a unique Redirect ID. The Redirect ID is stored in the Redirect column of the Field Float table associated with a bar of the bar graph.

When the world is generated, the generating mechanism examines the row of the Field Float table that is associated with the height of the bar graph. The generating mechanism determines that the value in the Redirect column is non-null. The generating mechanism looks up a row in the Redirect table 114 that has a Redirect ID value matching the value of the Redirect column of the Field Float table. The generating mechanism retrieves the SQL statement stored in the SQL Statement column of that row, and forwards the statement to the database 22. When a response is received, the value supplied in the response is used as the height of the bar in the bar graph.

A Field Table 108 can have more than one Redirect column. For example, the Field Vec3F table has three redirect columns named Redirect X, Redirect Y, and Redirect Z, corresponding to the X, Y, and Z substantive values of the Field Vec3F table. This enables each substantive value of a table to be determined by a database query.

It should be noted that the database schema disclosed herein is preferable to other approaches that can be contemplated. For example, another approach to building the database schema is to have a table for each VRML node, in which columns of the tables correspond to fields of the nodes. However, this approach does not permit the schema to be extended to accommodate user-defined nodes or protos.

SCRIPT TABLE

VRML defines a special node called a Script node. The Script node enables a VRML programmer to create fields and events, and then define the way they work by writing a script, which is a sequence of user-defined instructions. Implementations of VRML support different scripting languages. For example, the Cosmo Player VRML browser plug-in supports Java and JavaScript as scripting languages.

Script nodes can be defined as having any desired number of input events, output events, and intermediate data storage fields. Accordingly, in an embodiment, a Node Script table 116 stores a list of the fields defined for a particular script node. Each row of the Node Script table 116 represents a field that is defined for a particular script node. The Node Script table 116 has columns named World ID, Node ID, Field Type, Field Name, and Description. For a given field, the World ID column stores the world identifier of the world in which the field is defined. The Node ID column stores an identifier of the script node. The Field Type and Field Name columns store the type and name of a field associated with the script node.

The Description column stores an identifier of the nature of the field. In an embodiment, a value of 1 in the Description column indicates that the field is an ordinary "field"; a value of 2 indicates that the field is an "exposedField"; 3 indicates "eventIn"; and 4 indicates "eventOut". The quoted terms are defined in the VRML language specification and determine how a field participates in VRML's event routing mechanism.

ROUTE TABLE

The VRML language enables a programmer to specify "routes" that connect one node to another upon the occurrence of a specified event. As shown in FIG. 2B, a Route table 120 stores routing information that is decomposed from ROUTE statements in a VRML world. Each row of the Route table 120 corresponds to a ROUTE statement in a VRML world. The Route table 120 has columns named World ID, From Node, From Event, To Node, To Event, and Route Order. The World ID column stores a value that identifies a world defining a particular route. The From Node column stores the name of a node from which a route originates. The From Event column stores a value that identifies an event that triggers the passage of execution control from the From Node to another node, the name of which is stored in the To Node column. The To Event column stores a value that identifies an event that receives the passage of control from the route.

PROTO AND MAPPING TABLES

VRML 2.0 defines 54 standard nodes that enable a VRML world to have a wide variety of features, from simple shapes to complex animations and interactions. However, the 54 pre-defined nodes do not accomplish everything that a VRML author could conceivably want. Accordingly, VRML also includes a prototyping mechanism. Prototyping enables the author of a VRML world to collect nodes and routes and give them a standard interface; authors can also create nodes that extend the capability of the built-in VRML nodes. Prototyped or extended nodes are added to a world and used like any other node.

In VRML a prototype node or "proto" comprises a declaration section or header, an implementation section, and an instantiation. An example of a proto appears in Table 5.

TABLE 5

EXAMPLE PROTO

VRML V2.0 utf8
PROTO AnimatedMaterial [field SFTime seconds 1]
{
   DEF M Material {diffuseColor 1 0 0}
   DEF TS TimeSensor {

TABLE 5-continued

EXAMPLE PROTO cycleInterval IS seconds
      stopTime −1
      loop TRUE
   }
   DEF CI ColorInterpolator {
      key [0 0.5 1]
      keyValue [1 0 0, 0 1 0, 1 0 0]
   }
   ROUTE TS.fraction_changed TO CI.set_fraction
   ROUTE CI.value_changed TO M.diffuseColor
}
Shape {
   appearance Appearance {
      material AnimatedMaterial {seconds 5}
   }
   geometry Sphere { }
}

In this example, the declaration section or header of the proto is the text starting with the word "PROTO" and concluding with the curly brace that appears immediately before the word "Shape".

In an embodiment of the invention, information about proto definitions is stored in a Proto table 122. Each row of the Proto table 122 stores information about one proto. The Proto table 122 has columns named World ID, Node ID, Proto ID, Proto Order, and URL. The World ID column references an identifier of a world in the system. The Node ID column stores an identifier of a parent node, if any, associated with the proto. This covers the case where a PROTO definition occurs within the body of a specific node. The Proto ID column stores an identifier value that uniquely identifies the proto represented by the row of the Proto table 122.

The Proto Order column stores a numeric value that indicates the relative order in which the proto is to be interpreted by the VRML interpreter or browser, compared to other protos that are defined in the system. Thus, the Proto Order value provides a way to establish dependencies among protos, so that the VRML interpreter or browser will first interpret protos on which other protos depend.

The VRML language defines two types of protos: regular protos and "externprotos" which are defined in a file external to the current VRML world. In the Proto table 122, when the proto of a particular row is a regular proto, the URL column stores a null value. When the proto of a particular row is an "externproto," the URL column stores the Uniform Resource Locator of a file that defines the proto.

Other information about a particular proto is stored in the Node Definitions table 134 shown in FIG. 2C. The Node Definitions table 134 generally stores information defining nodes; each row of the Node Definitions table 134 corresponds to a node. The Node Definitions table 134 has colurmns named Node ID, Field ID, Field Name, and Description. The header of the proto is decomposed, and nodes defined in the header are stored in rows of the Node Definitions table 134. In each row, the Proto ID value stored in the Proto table 122 is stored in the Field ID column of the Node Definitions table 134.

The name of a proto is stored in a Node Descriptions table 124. The Node Descriptions table 124 provides a mapping of proto node identifiers to proto node names and worlds. The Node Descriptions table 124 is used for all nodes, so that the 54 basic VRML nodes are treated in the same manner as custom PROTO nodes; special logic is not necessary for the basic VRML nodes. It allows different worlds to store different proto implementations having the same name. Each row of the Node Descriptions table 124 uniquely corresponds to one proto node. The Node Descriptions table 124 has columns named ID, Node Name, World ID, and Is Grouping. The ID column stores an identifier value that is uniquely associated with one proto node. The Node Name column stores the name of the proto node. The World ID stores an identifier of a world that is associated with the node, or in which the proto node is defined. The Is Grouping column stores a value, such as a Boolean value, that indicates whether the node is a "grouping" node that can have other nodes as children.

An IS Mapping table 126 is used to store IS mappings for proto implementations. Within a PROTO definition, according to the VRML language definition, the IS statement is used to associate a specified field with a field value that is defined in the PROTO header. The IS Mapping table 126 has columns named World ID, Node ID, Field Name, and Mapped Name. The World ID, Node ID, and Field Name values are used to uniquely identify a given node field as having an IS mapping. The Mapped Name value defines the value of the IS mapping.

MISCELLANEOUS TABLES

The database schema also includes tables for handling miscellaneous features and functions. For example, the VRML language defines a USE keyword that can be placed at any place in a VRML world definition in which a node definition is permitted. The USE keyword provides a way to refer to a previously named and defined node so that the referenced node does not have to be repeated in the VRML file. Accordingly, the schema provides a way to store USE references, in a Use table 125. Each row of the Use table 125 is associated with one USE keyword. The Use table 125 has columns named World ID, Node ID, and Node Name. Values in the World ID identify the world with which the current row is associated. A USE node will have an entry stored in the Nodes table 106 with a value of "USE" in the Node Name column. In the Use table 125, the values of the World ID column and the Node ID column match corresponding values in the Nodes table. The Node Name column stores the actual text value for the name of the node referenced by the USE keyword. Thus, in the schema, instances of USE keywords in a VRML file are treated like nodes. The Node Name column stores the name of the node referenced by the USE keyword.

The database schema provides a way to generate nodes dynamically from the database 20. A Dynamic Children table 128 is used to track nodes that have children with fields that are dynamically generated using SQL queries applied to the external database 22. Each row of the Dynamic Children table 128 represents a node having a child node that has at least one dynamically generated field. The Dynamic Children table 128 has columns named Parent World ID and Child World ID. The Parent World ID column stores a value referencing a parent world or parent node. The Child World ID column stores a value identifying the child node that has the dynamically generated field. The Dynamic Children table 128 is used by a graphical user interface generating utility to distinctly display all nodes containing dynamically generated values.

A Raw table 130 is used to store the raw text of the VRML source file on the server that is decomposed into the database 20. Each row of the Raw table 130 corresponds to a block of text in the original VRML world or source text. The Raw table 130 has columns named ID, Text, Start Line In World, and Line Count. The ID column stores a unique identifier associated with a group of text. The Text column is a string field that stores text read from the VRML source file. The Start Line In World column stores a numeric value indicating the line number within the VRML source file at which the group of text stored in the Text column begins. The Line Count column stores a numeric value indicating the number of lines in the source file that are represented by the text that is stored in the Text column.

In an embodiment of the invention, zero or more portions of a VRML world are stored in the form of raw text in the Raw table 130, and one or more portions of the world are stored in decomposed form in the other tables that have been described above. In this embodiment, when a VRML world is to be rendered, mechanisms of the embodiment deliver the portions of the world from the Raw table 130 and the other tables 108 to the browser 26. This allows the implementation to optimize the delivery of the world by automatically combining the original text with decomposed portions. In this context, the term "component" is also used to refer to a portion of a world. A component is a group of VRML text, or one or more decomposed nodes stored in the above-described tables 108.

To facilitate this process, the database 20 includes a Composition table 132 that describes the portions of the world and their characteristics. Each row of the Composition table 132 corresponds to a component of the world. The Composition table 132 has columns named ID, Component Type, Component ID, Start Line, End Line, Start Character, End Character, Parent ID, and Parent Field. The ID column stores an identifier value that is uniquely associated with a row of the Composition table 132. Thus, the ID column serves as a row identifier.

The Component Type column stores a value indicating whether the component stored in the current row is a raw text chunk or a decomposed world. In an embodiment, the value 1 indicates a decomposed world, and the value 2 indicates a raw text chunk. The Component ID column stores an identifier that is uniquely associated with a component. In an embodiment, the Component ID value is unique to a component, whereas the ID value is unique to a row. Thus, a particular component may be represented in more than one row, each of which stores the same Component ID.

When the component is a decomposed world, the Component ID value matches or references a World ID or External ID value stored in the Description table 104. Also in that case, the Parent ID and Parent Field columns provide information referencing the parent node of the component. Thus, to deliver a decomposed component to the VRML interpreter 28 of the browser 26, the generating mechanism discussed further below reads values from the Parent ID and Parent Field columns, looks up the node identified by the Parent ID in the Nodes table, builds the required text, and delivers it to the browser 26.

When the component is raw text that is stored in the Raw table 130, the Component ID value of the Composition table matches or references an ID value in the Raw table. Also, in this case, the Start Line, End Line, Start Character, and End Character columns store numeric values that define a range of text to be delivered. In particular, these columns respectively store the starting line number, ending line number, starting character number within the starting line, and ending character number within the ending line for the text that is to be delivered. Thus, to deliver a raw text component to the browser 26, the mechanisms discussed further below read the values of the Start Line, End Line, Start Character, and End Character columns, locate the text file that stores the raw text of the world on the server 10, and read characters from the text file within the indicated range. A stream of characters is then delivered to the browser 26.

DESCRIPTION AND DEFINITION TABLES

The names of pre-defined VRML fields are mapped to unique identifiers in a Field Descriptions table 136. Each row of the Field Descriptions table 136 stores values that represent a pre-defined VRML field. The Field Descriptions table 136 has columns named ID, Field Name, and Is Multi. The ID column stores a field identifier value that is uniquely associated with a field. The Field Name column stores the name of the field. The Is Multi column stores a Boolean value indicating whether the field is used to store multiple values. In one embodiment, the Field Descriptions table 136 stores the values set forth in Table 6 below.

TABLE 6

EXAMPLE VALUES OF FIELD DESCRIPTIONS TABLE

| ID | FIELD NAME | IS MULTI |
|---|---|---|
| 1 | SFBool | False |
| 2 | SFColor | False |
| 3 | MFColor | True |
| 4 | SFFloat | False |
| 5 | MFFloat | True |
| 6 | SFImage | False |
| 7 | SFInt32 | False |
| 8 | MFInt32 | True |
| 9 | SFNode | False |
| 10 | MFNode | True |
| 11 | SFRotation | False |
| 12 | MFRotation | True |
| 13 | SFString | False |
| 14 | MFString | True |
| 15 | SFTime | False |
| 16 | MFTime | True |
| 17 | SFVec2f | False |
| 18 | MFVec2f | True |
| 19 | SFVec3f | False |
| 20 | MFVec3f | True |

Thus, the pyrpose of the Field Descriptions table is to keep track of all defined field names and to a unique identifier. Values in the ID column are referenced by the node Script table 116 and Node Definition table 134.

A node Definitions table 134 provides a mapping of nodes to fields. Using the Node definitions table 134, given a particular node, all the fields of that node can be identified. Each row of the Node Definitions table 134 stores information that describes a field of a node. Thus each node defined with more than one field is represented by multiple rows of the Node Definitions table 134. The Node Definitions table 134 has columns named Node ID, field, ID, Field Name, and Description. The Node ID column stores a value that matches one of the identifiers stored in the ID column of the Node Descriptions table 124. The Field ID column store a value that matches one of the identifiers stored in the ID column of the Field Description table 136. The Field Name column stores the name of the field. The Description column stores an identifier that indicates the nature of the field, using the same values described above in connection with the Description column of the Script table 116.

In the preferred embodiment, values stored in the Node Definitions table 134 are derived from the VRML 2.0 language specification, which is published at http://www.vrml.sgi.com/moving-worlds/. Example values for the Anchor node of the VRML language are set forth in Table 7 below.

TABLE 7

EXAMPLE VALUES OF NODE DEFINITIONS TABLE

| NODE ID | FIELD ID | FIELD NAME | DESCRIPTION |
|---|---|---|---|
| Anchor | MFNode | children | 2 |
| Anchor | SFString | description | 2 |
| Anchor | MFString | parameters | 2 |
| Anchor | MFString | url | 2 |
| Anchor | SFVec3f | bboxCenter | 1 |
| Anchor | SFVec3f | bboxSize | 1 |
| Anchor | MFNode | addChildren | 3 |
| Anchor | MFNode | removeChildren | 3 |

For clarity, in Table 7 above the Node ID and Field ID columns show text values; however, in the preferred embodiment, as stated above, these columns store pointers, numeric values, or other non-textual identifiers that reference the Node Description table 124 and Field Description table 136.

PROCESSING VIRTUAL WORLDS USING A DATABASE

In one embodiment, the schema described above is implemented in a database system that is accessible to mechanisms for processing VRML worlds. In this embodiment, the mechanisms are implemented as one or more computer programs that can communicate with the database server 34 and exchange information with it including information that is stored in the database 20. Preferably, one of the computer programs provides the general functions listed in Table 8. It is convenient to refer to this program as the administration program. Alternatively, the administrative functions are implemented as administration pages 32 having a hyperlink associated with each function. Clicking on a hyperlink activates a Web server application that carries out the function.

TABLE 8

ADMINISTRATION PROGRAM FUNCTIONS

| | |
|---|---|
| 1. | Import a virtual world into the database |
| 2. | List all virtual worlds in the database |
| 3. | Rename a virtual world in the database |
| 4. | Delete a virtual world in the database |
| 5. | Associate SQL statements with fields in the world |

IMPORTING A VIRTUAL WORLD INTO A DATABASE

Figure 3A:
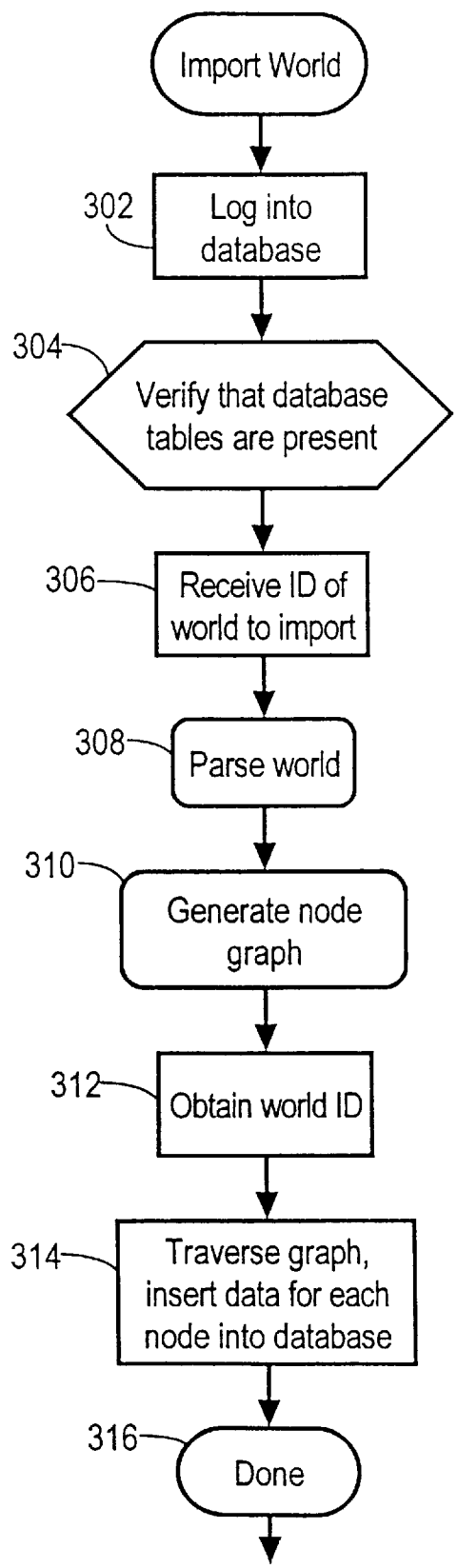
FIG. 3A is a flow diagram of a method of importing a virtual world into a database.

FIG. 3A is a flow diagram of a method of importing a virtual world into a database. In the preferred embodiment, the method shown in FIG. 3A is carried out using a VRML world as input and using a database organized according to the schema shown in FIG. 2A, 2B, and 2C.

In the embodiment shown in FIG. 3A, a method is initiated by logging into a database, such as the database server 34 that is managing tables organized in the schema shown in FIG. 2A, 2B, and 2C. Preferably, the administration pages 32 include a configuration mechanism whereby a system administrator can define the name of a database accessible to the VRML Agent and manager application. In step 302, a manager application presents a login dialog to the user that prompts the user to enter a user name, password, and database name. The user enters the requested information. If it matches the information provided by the system administrator in the configuration step, and the user name and password are recognized by the named database server, then a connection is established to the named database. In subsequent operations, the then-current database connection is used for communications with the tables of the database schema shown in FIG. 2A, FIG. 2B, and FIG. 2C.

In step 304, the method verifies that all the necessary database tables are present in the schema. In step 306, the method receives an identifier of a virtual world that is to be imported into the database. Step 306 may involve, for example, prompting a user of the client 24 to enter the name of a VRML world file to import, using a File Open dialog of the operating system 30 of the client. The method receives the file name entered by the user. Preferably, the user also enters a descriptive name for the world that is stored in association with the file name. In this way, the user can associate the world with an easy-to-remember name rather than a long path name required by the file system of the operating system 30.

In step 308, the world is scanned or parsed to identify each node in the world. Step 308 involves, for example, executing a parsing program that receives a standard VRML world source file as input. An example of the parsing program is the VRML 2.0 parser available from Silicon Graphics, Inc. The parser is configured to recognize nodes in the source file and call a pre-defined function called NEW when a node is recognized by the parser or available for processing. In an embodiment of the invention, the NEW function is configured to carry out the further steps discussed below each time a node is recognized.

In step 310, the method generates a graph of the nodes. In step 312, the method obtains a unique identifier for the database representation of the world. In the preferred embodiment, the identifier is a World ID that is generated using a sequencing capability of the database server 34.

In step 314, the node graph is traversed, and data for each node is inserted into tables of the database. In a preferred embodiment, information about each node is inserted into the tables 104–140 of the database 20, using SQL INSERT statements that are recognized by the database server 34, and according to the conditions and constraints that are described above. Preferably, as nodes are inserted, the manager application 14 displays a dialog showing the number of nodes that have been inserted, in association with the name of the world and its date of creation. As a result, the virtual world is decomposed, imported into and stored in the database 20. Accordingly, at step 316 the method is complete.

In the preferred embodiment, by default, all node data pertaining to fields of nodes is stored in the Field tables 108 of the database 20, and not in the Redirect table 114.

USING DYNAMICALLY GENERATED DATA IN A WORLD

The mechanisms of the preferred embodiment also provide a way to associate Structured Query Language (SQL) statements and PL/SQL function calls with fields in a world that is stored in the database 20. In the preferred embodiment, the administration program includes a utility that enables a user to access and store information in the Redirect table 114. Once a world has been imported, it can be made dynamic by associating SQL statements and PL/SQL function calls with fields in the world.

ADDING DYNAMIC VALUES TO A FIELD

Preferably, an embodiment includes a program, process, or module that can display an outline view of all the nodes and fields defined in a world and stored in a database. The outline view presents a hierarchical display of a world, with each node and field represented by an icon and a name on the display of the user's workstation. The relationship of parent and child nodes is indicated using indentation in the outline view. The outline view includes vertical and horizontal scroll bars that enable the user to scroll the outline view to display any portions that are not visible within the field of view of the workstation.

Preferably, to obtain the outline view, a user executes the manager application 14, either on the server or client 24, selects the world and chooses the Edit→Modify World menu item from a pull-down menu of the manager application 14. In response, in one embodiment, the manager application 14 displays the Modify World dialog 500 shown in FIG. 5A. The Modify World dialog 500 has an outline view 502, a code type drop-down list 512, a code entry field 514, and function buttons 520.

The outline view 502 displays all top-level nodes in the world. Each node and field is represented by an icon 550 and a node name 552. Fields having dynamic children are displayed in a highlighted color; the dialog 500 consults the Dynamic Children table to determine which nodes to draw in a highlighted color within the outline view. A node can be expanded by clicking on the box containing a "+" symbol to the left of the node icon, or by double-clicking on the node name; expanding a node displays a list of all fields in that node. If a field is of type SFNode or MFNode, expanding it will display a list of all children nodes. If a field is a Color, Rotation, Vec2f, or Vec3f field, expanding it will display a list of the field members. Clicking on any other type of field will select it for editing. In the example outline view 502 of FIG. 5A, the Ti Transform node 506 and the scale field have been expanded 508.

Figure 5A:
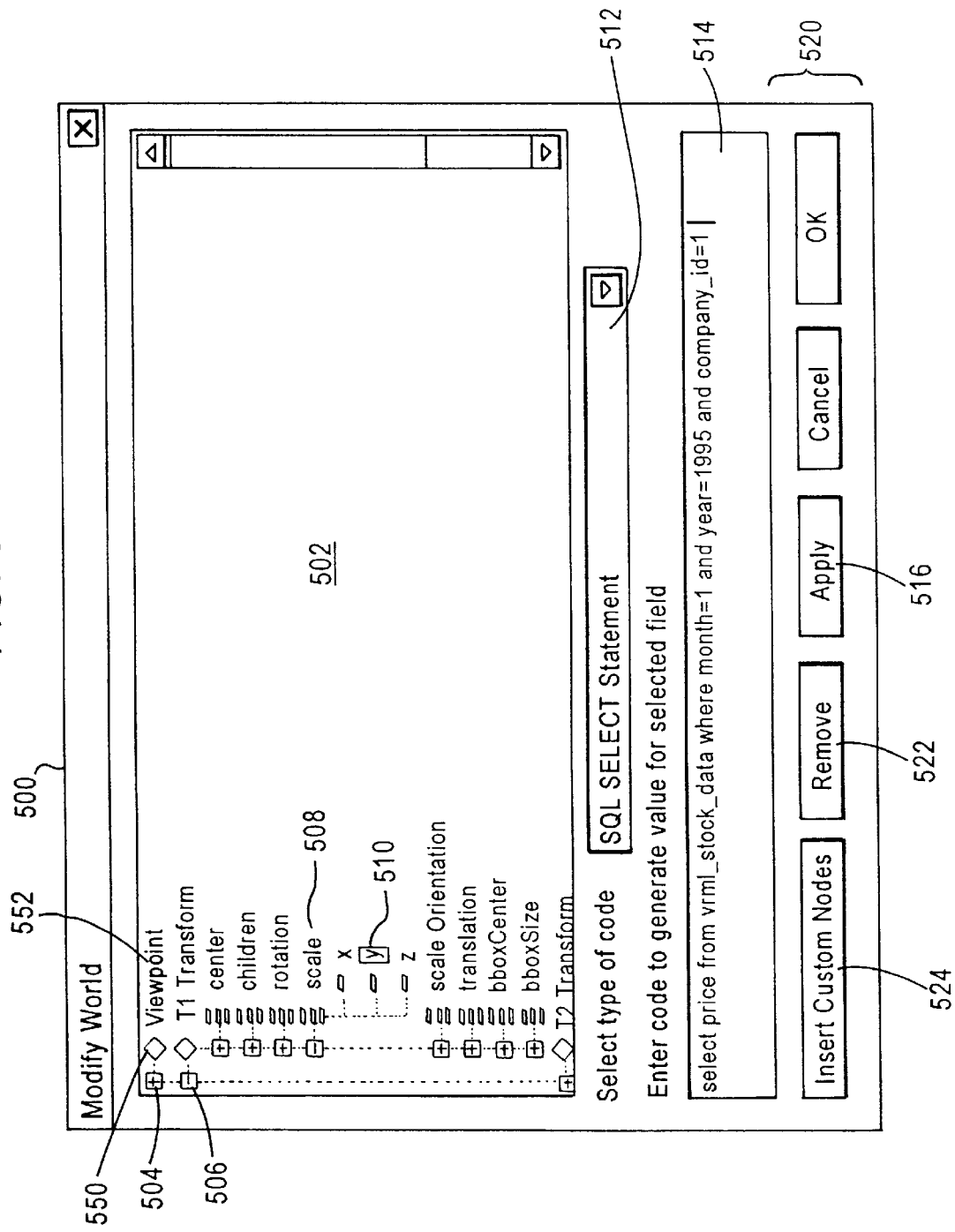
FIG. 5A is a diagram of a Modify World dialog displayed by an embodiment.

Using the outline view 502, a user selects a node and a field of the selected node. The "y" field 510 has been selected for editing and is shown in highlighted fashion. Using a pull-down menu or other function selection mechanism, the user instructs the dialog 500 that the user wishes to associate a SQL statement with the selected field. For example, to enter a SQL statement, the user chooses "SQL SELECT Statement" from the code type drop-down list 512. The user then enters a SQL statement in the code entry field 514. An example SQL statement is shown in FIG. 5A. Alternatively, to enter a PL/SQL function call, the user chooses "PL/SQL Function Call" from the code type drop-down list 512 and enters the name of a function call.

In the preferred embodiment, parameters are associated with an SQL statement or PL/SQL function call, and values are passed to the parameters through the URL that identifies a world to be rendered. A parameter is identified in a SQL statement by naming the parameter and surrounding it in colon characters. For example, the SQL statement entered in the code entry field 514 is "select price from vrml_stock_data where month=1 and year=1995 and company_id=:cid:". The element "cid" is a parameter. To specify a value for the parameter, the world is generated by calling the VRML Agent 16 from the browser 26 using a URL in the following format:

http://webtest/vrml/vrml.generate_params_vrml?world
id=1 &cid=1

This URL activates the VRML Agent 16 and passes the value "1" to the parameter "cid". Any number of parameters can be defined, and any number of pairs of parameters and values can be placed in a URL.

In the preferred embodiment, SQL statements and PL/SQL function calls can be defined for the following field types: Boolean; color (red, green, blue values), float, int32, rotation (x, y, z, and degree values), string, time, vec2f (x and y values), and vec3f (x, y, and z values). The SQL statements are standard SQL SELECT statements that return one column as a result. When the embodiment is used in the Oracle® database environment, the PL/SQL function calls use the HTP.PRN utility function to generate VRML code in the form of text output; this code is placed into the generated VRML world as the field value.

To use a PL/SQL function call in the code entry field 514, the name of the function call and its parameters are entered. For example, to associate a field of type "uri" with a PL/SQL function that generates a URL, the "url" field is selected in the outline view, and the function call name "vrml_anchor_url(:category:,:name:)" is entered in the code entry field 514. The function call is defined using the following PL/SQL source code:

```
create or replace procedure vrml_anchor_url(category in number,
                                parent_name in varchar2) is
begin
    htp.prn('http://');
    /* note: assume using port 80 */
    /* use function call in owa_util package to get server name */
    htp.prn(owa_util.get_cgi_env('SERVER_NAME'));
    htp.prn('/vrml/');
    htp.prn('vrml.generate_params_vrml?world_name=stockgraph&param=category,')
    htp.prn(category+1);
    htp.prn('¶m=parent_name,');
    htp.prn(parent_name)
end;
```

The code example above demonstrates use of the "htp.prn" facility to output the text of a URL or other VRML code.

To persistently associate the SQL statement or PL/SQL function call with the selected field, the user clicks on the Apply function button 516. In response, the application inserts a row into the Redirect table 114, and stores the current World ID in the World ID column of the table. The application generates or requests a new unique redirect identifier and stores it in the Redirect ID column of the Redirect table 114. The text entered by the user is stored in the SQL Statement column of the Redirect table 114. Thereafter, when the virtual world is delivered to the browser 26 by the VRML Agent 16, the SQL statement is executed and the value of the selected field is generated dynamically from the database.

If a different field is selected in the outline view 502 before the Apply button 516 is selected, any changes entered for a prior field are not stored.

The OK button and Cancel button, shown as two of the function buttons 520, respectively enable the user to save all changes and exit the dialog, and exit the dialog without saving changes.

REMOVING DYNAMIC VALUES FROM A FIELD

The Remove function button 522 is used to delete a statement or function call previously associated with a field. When a field is selected, the application displays any existing statement or function call in the code entry field 514. Clicking on the Remove button 522 deletes the statement or function call from the Redirect table 114 and clears the code entry field 514.

INSERTING CUSTOM NODES

Preferably the application also provides a way to insert custom nodes into a virtual world after the world has been imported into the database. Using the functions described above, a user can make existing portions of a VRML world dynamic by generating field values on-the-fly. However, the functions discussed thus far to do not permit a user to introduce new geometry into a scene. Inserting custom nodes overcomes this limitation. Using either a PL/SQL function or an embedded world, a user can generate an arbitrary number of new nodes within an MFNode field, thereby creating new geometry on the fly.

Figure 5B:
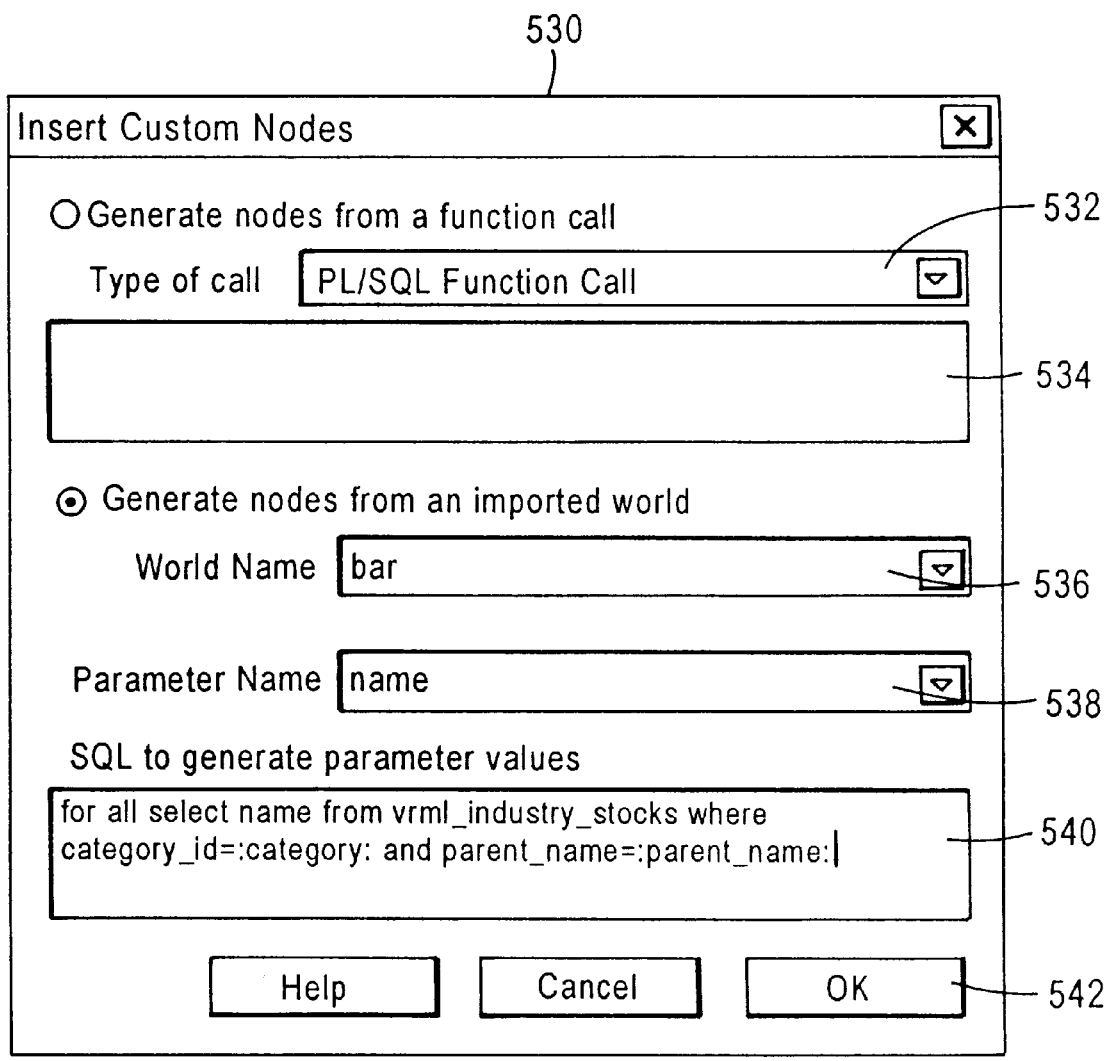
FIG. 5B is a diagram of an Insert Custom Nodes dialog displayed by an embodiment.

To insert a custom node, in the preferred embodiment, a user activates the Modify World Dialogue 500, selects a field that is an MFNode field, and clicks on the Insert Custom Nodes button 524. In response, the manager application 14 displays the Insert Custom Nodes dialog 530 shown in FIG. 5B. As indicated by the pushbutton elements of the dialog 530, there are two ways to insert a custom node: by calling a PL/SQL function; and by embedding another world.

Custom nodes are generated using a PL/SQL function by clicking the "Generate nodes from a function call" button in the Insert Custom Nodes dialog 530. The user selects the type of call from a call type pull-down menu 532. For example, the selected call type is "PL/SQL Function Call." The user enters the name of the function call in a text entry field 534. Embedded variables can be used. The function call must use the HTP.PRN utility function to create VRML text, which will be inserted into the VRML world and executed when the MFNode field is evaluated. When the user clicks on the "OK" button 542, the function call name is stored in the database 20 and associated with the selected MFNode field.

Custom nodes also can be generated from an imported world. To associate an external world with the current selected MFNode field, the user selects the "Generate nodes from an imported world" button in the Insert Custom Nodes dialog 530. The user enters the name of another world in the World Name field 536. The user also enters the name of a parameter in the Parameter Name field 538. The named parameter will be passed into the named world. The user also enters an SQL statement in the SQL field 540; the statement is used to generate values for the named parameter. For example, the SQL statement is: "for all select name from vrml_industry_stocks where category_id=:category: and parent_name=:parent_name:" The SQL statement is prefaced with "for all" to ensure that all rows matching the query are returned. Also, the SQL statement returns a single column (name).

Thereafter, when the world is generated, the VRML Agent 16 executes the SQL statement, and for each value returned from the database 22, the VRML Agent generates a copy of the selected world, substituting the returned value for the named parameter. Any other variables that were defined in the URL used to generate the parent world are also passed through to the embedded world.

When the current world is generated by calling the VRML Agent 16, the SQL statement is executed. Each value returned by the statement is assigned to the specified parameter. The VRML Agent 16 then generates the embedded world, passing in the specific parameter value, as well as all other parameter values passed into the parent world.

In this way, a user can generate multiple copies of another world stored by the application. This is useful, for example, when a user desires to display multiple copies of similar geometry, which each copy differs from another by a limited number of attributes such as location, title, or color. Each geometry is represented by an individual world that is imported into the database. Then multiple copies of each world are instantiated.

EMBEDDING DYNAMIC VALUES IN A VIRTUAL WORLD SOURCE FILE

The Modify World dialog described above provides one way to add dynamically generated values to a virtual world. Another way to accomplish the same result is to embed nodes that define dynamic values in the source text of a virtual world. In the preferred embodiment, VRML nodes called ServerRedirect and ServerRedirectValue are defined according to the VRML source code set forth in Table 9:

TABLE 9

SERVERREDIRECT, SERVERREDIRECTVALUE NODES

```
PROTO ServerRedirect [
    field SFString node_name""
    field SFString field_name""
    field SFString field_member""
    field SFString code""
    field SFString code_type "SQL"
    field SFString world_name""
    field SFString param_name""]
{WorldInfo { }}
PROTO ServerRedirectValue [
    field SFString param_name""
    field SFString param_value""]
{WorldInfo { }}
```

These nodes are stored on the server 10 so as to be accessible to virtual worlds. To make a field dynamic, in the preferred embodiment, the ServerRedirect node is included in the source text of the VRML world, with values supplied for the parameters specified above. For example, the node_name field specifies the name of the node to make dynamic. The field_name field specifies the name of the field to make dynamic. The field_member field specifies the name of the field member to make dynamic. As an example, the members of a field of type SFVec3f are "x", "y", and "z". The code field is the text of the SQL statement or PL/SQL function call that is to be executed. The code_type field is either "SQL" or "PL/SQL", and defines the type of call specified by the "code" field. The world_name field is used to indicate that the specified world should be generated as an embedded world. The SQL statement defined by the "code" field is used to generate values for this field.

For example, a virtual world has a node called "bar" that defines a 3D bar for a bar graph display. The following node makes the height of a bar dynamic, based upon the absolute value of a stock performance data item that is read from a table of industry stocks:

```
ServerRedirect {
    node_name "bar"
    field_name "size"
    field_member "y"
    code "select abs(performance) from vrml_industry_stocks
where category_id=:category: and name=:name:"
    code_type "SQL"
}
```

The source text of the VRML world also includes the ServerRedirectValue node for any variable embedded in the SQL statements defined in the world. In that node, the param_name field specifies the variable name, and the param_value field specifies the default value for that variable.

In one embodiment, the ServerRedirect node and ServerRedirectValue nodes are entered into the source text of a VRML world file manually or using an editor. In the preferred embodiment, the ServerRedirect node and ServerRedirectValue nodes are added to a world automatically by the VRML Agent when a world is exported to a VRML text file. The export function is described further below.

CHANGING VALUES WITH PREFERENCES DIALOG

Explicit values can be entered and associated with a field using a setting in a Preferences dialog. The Preferences dialog controls various options for the administration utility function. For example, the options that can be set using the Preferences dialog include whether users are prompted for default value for embedded variables, and whether redirect values can be set for entire Color, Rotation, Vec2f, and Vec3f fields, in addition to field members.

DATABASE MODIFICATION AND INVESTIGATION

Embodiments of the invention make it possible for a virtual world to be altered easily and incrementally. For example, to change the world, selected database table records are changed. There is no need to retrieve and resave an entire VRML source file. Embodiments of the invention also provide mechanisms for investigating worlds and locating desired features such as particular nodes.

For example, when a virtual world is stored in a database in the manner that is described herein, the user can query the database to identify properties of the world, without having to retrieve, display, and navigate through the entire world. In one embodiment, the Description table stores investigation properties relating to a world, including world size, bounding-box regions, and number of polygons. The manager application 14 has an interface that allows a user to query the database 20 for values of the properties. For example, the interface is a set of Java language classes and C language functions that directly update the contents of individual fields and nodes. An example of an interface is the "Data Repository Persistence API" set forth in Appendix 1. There is no need to load and search through a lengthy VRML text file to find a particular scene or node.

RECOMPOSING, GENERATING AND DISPLAYING A WORLD

Figure 4A:
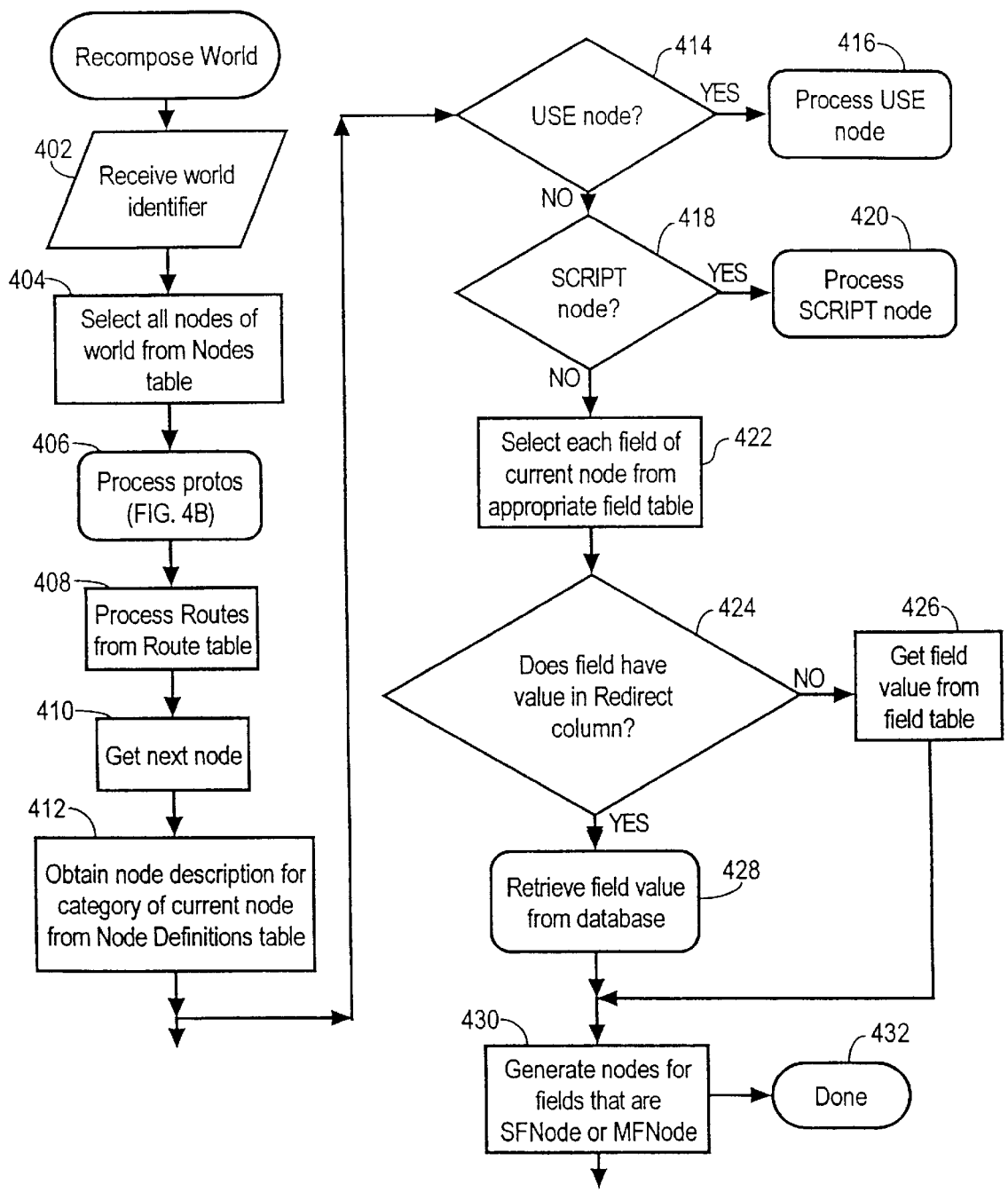
FIG. 4A is a flow diagram of a method of recomposing a virtual world from a database.

In the preferred embodiment, the VRML Agent 16 is configured to carry out a method of recomposing a virtual world from the database 20 and delivering a stream of VRML source text to the browser 26. The method is responsible for obtaining information that describes a VRML world from the database 20, including dynamically generated values that may be provided by the external database 22, and generating a stream of text in the VRML language. The browser 26 is responsible for interpreting the stream of text and displaying a 3D image in a window of the browser using the VRML interpreter 28. An embodiment of such a method is shown in FIG. 4.

In block 402, an identifier of a world to be rendered is received. In the preferred embodiment, the VRML Agent 16 receives the world identifier, and initiates operation, in several ways. In one embodiment, the VRML Agent16 is implemented as a PL/SQL package that outputs the specified world to the standard output device of the system on which the package is running. An exemplary definition of the PL/SQL package is set forth in Table 10.

TABLE 10

EXAMPLE VRML AGENT PACKAGE DEFINITION

```
CREATE OR REPLACE package VRML as
    procedure generate_VRML(
        world_id in number        /* indexes World ID column of
                                     Nodes table */
        generate_keys in boolean  /* whether to include node id's */
    );
end;
```

A package defined in this way can be called directly from within a PL/SQL program. The generate_keys parameter indicates whether each node in the generated file should have a unique identifying key. The key is intended to provide forward compatibility of nodes with future versions of or improvements upon the VRML Agent 16.

In another embodiment, the VRML Agent 16 is encapsulated in a class definition in the Java language, so that the mechanism can be called from within a Java program running on the server 10 or client 24. An example class definition is set forth in Table 11.

TABLE 11

EXAMPLE VRML AGENT JAVA CLASS DEFINITION

```
public class VRML {
    public VRML(Session session) {...}
    public void generate_VRML(Pdouble world_id, Pboolean generate_keys)
        throws ServerException {...}
}
```

A Web site developer or a Web application accesses the VRML Agent 16 in the same manner that PL/SQL or Java is used to dynamically generate HTML pages. For example, a Web page of the Web site has a URL in the page. When the user selects the URL, the browser 26 sends the URL to the server 10. The URL invokes the PL/SQL Agent and calls a PL/SQL procedure stored on the server 10. That function calls the a generate_vrml procedure of the VRML Agent 16 to output a VRML file to the browser 26 for interpretation by the VRML interpreter 28. Generally, a browser 26 can call this function directly when a user clicks on a URL having the following syntax:

http://www.webserver.com/vrml/vrml.generate_vrml?world id=1

In this example, www.webserver.com refers to the Web server that hosts the VRML Agent; vrml/identifies the subdirectory in which executables of the VRML Agent 16 are stored; and vrml.generate_vrml identifies the VRML Agent 16 procedure. The world_id=1 parameter indicates that the Web application is commanding the VRML Agent 16 to generate VRML text for a world having a world identifier of 1. Alternatively, the world can be identified by name. In that case, the world_id=1 parameter is omitted, and a parameter of the form world_name=name, where name is the name of the world, is substituted.

When a world contains variables within associated SQL statements or PL/SQL function calls, the world is generated using a URL of the form http://server_name/vrml/vrml.generate_narams_vrml?world_name=name&(param)=(value)

where server_name identifies a Web server, vrml.generate_params_vrml is the name of the VRML Agent 16, world_name=name identifies the world, and (param)=(value) provides a value for the parameter. Multiple pairs of parameter names and values can be supplied. Each "param" parameter defines one variable name and the value that variable is to receive.

When the world identifier is received and the VRML Agent 16 is invoked, as shown in block 404, the VRML Agent 16 selects all nodes of the selected world from the Nodes table 106. Preferably, the nodes are selected in the order indicated by the values of the Node Order column of the Nodes table 104. The method then generates VRML text from the stored node definitions. The specific steps that are taken depend upon the nature of the node.

Figure 4B:
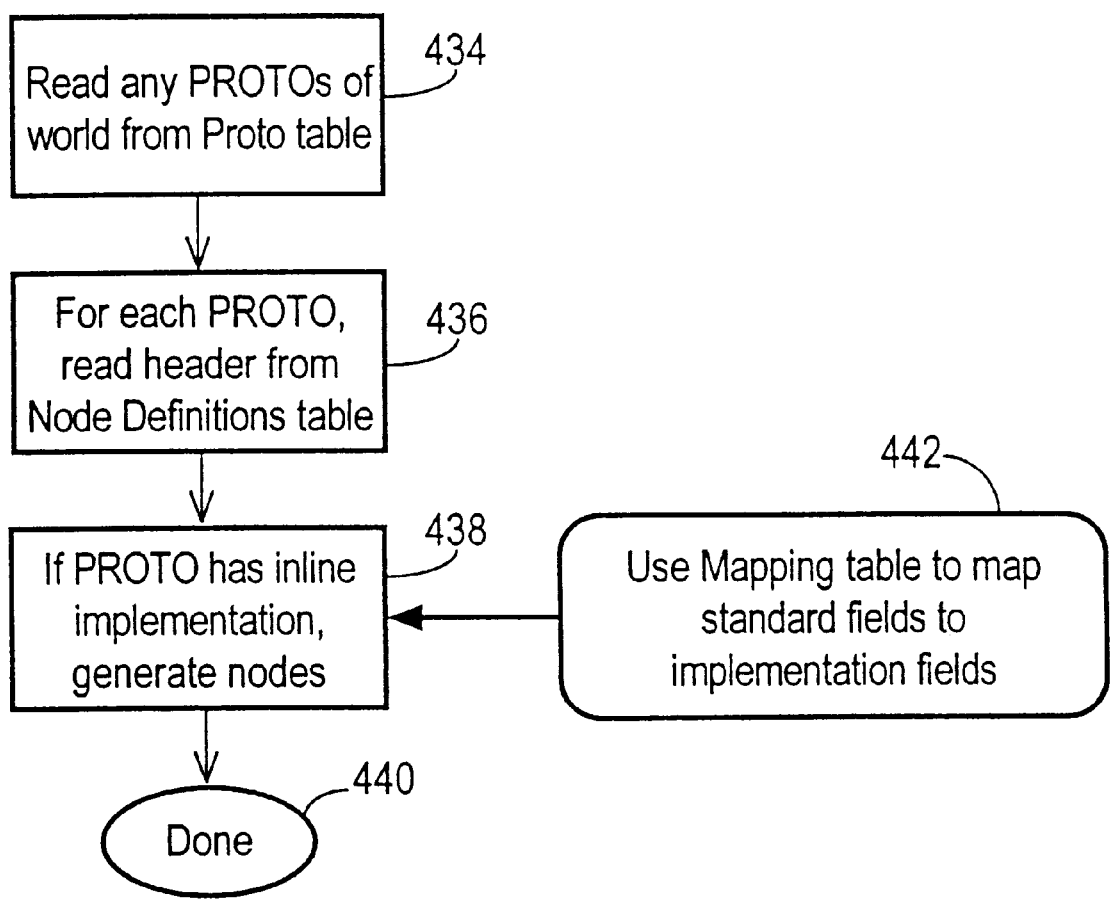
FIG. 4B is a flow diagram of additional steps in the method of FIG. 4A.

For example, when a node is a proto definition, as shown in block 406, special processing is used. FIG. 4B is a flow diagram of an embodiment of a method of processing protos. In this embodiment, in block 434, the VRML Agent reads 16 any proto nodes that are defined for the world from the Proto table 122. This can be done by issuing a query to the Proto table 122 using the current World ID as a key. The query returns a set of identifiers that identify proto definitions. In block 436, for each proto node, the VRML Agent reads the proto header from the Node Definitions table 134. For example, a query is issued to the Node Definitions table 134 using the current Node ID as a key. The proto header or interface is read from the Description column of the Node Definitions table 134. Thus, there is special logic to generate the text of a PROTO definition. However, subsequent instances of that PROTO are treated just like instances of the built-in nodes.

As shown in block 438, if the proto has an inline implementation, nodes are generated according to the implementation definition using a recursive call to a node generation function of the VRML Agent, using the Proto ID as the World ID. As indicated in block 442, when the nodes are generated, the Is Mapping table 126 is used to determine which fields defined in the database map to the fields defined in the proto interface. For example, a query is issued to the Is Mapping table 126 using the current World ID as a key, and using the Proto ID as a key for the Node ID column. When a row is returned from the Is Mapping table 126, for each field defined in the proto interface, the VRML Agent matches the field name to the value of the Field Name column, and locates the corresponding Mapped Name. As a result, dynamic VRML text is generated for each proto implementation.

As shown in block 408, any Routes defined for the world are read from the Route table 120. Block 408 involves applying a query to the Routes table 120 using the current world identifier as a key to the World ID column, and using the Route Order column as a secondary key. This returns a set of rows, reflecting routes, in sorted order. For each row that is returned in response to the query, the VRML Agent mechanism reads the values of the From Node, From Event, To Node, and To Event columns. Using these values, the VRML Agent constructs one or more Route statements according to the syntax of the VRML language.

In block 410, the VRML Agent selects the next node to be processed. As shown in block 412, the VRML Agent obtains the node description for that node category from the Description column of the Node Definitions table 134. The VRML Agent then selects each field of the current node from one of the Field tables 108, using the node description to identify the correct field type and field table name.

In block 414, the VRML Agent tests whether the current node is a USE type node. If so, in block 416 the USE node is processed. Block 416 involves, for example, reading the name of the node from the Description column of the Node Use table. The name of the node is then output in the VRML text stream.

In block 418, the VRML Agent tests whether the current node is a SCRIPT type node. If it is, then block 420 the script node is processed. For example, the VRML Agent applies the current World ID and Node ID in a query to the Node Script table 116 using the World ID and Node ID columns as keys. Field names corresponding to the current script node are then read from rows of the Node Script table 116. Each field is then processed as shown in blocks 422 to 432.

In block 422, the VRML Agent selects each field of the current node from the appropriate field table. In this context, "appropriate field table" means one of the field tables 108 that has the same type as the current field of the current node. Each field of a node is processed according to the logic shown in block 422 through 432.

In block 424, the VRML Agent tests whether the row of the appropriate field table for the current field has a value in the Redirect column. If it does, then as shown in block 428, the field's value is retrieved from the external database 22. If there is no value in the Redirect column, then in block 426 the value of the field is retrieved from one or more substantive value columns of the field table. For example, in the case of a Vec3F type field, in block 426 the VRML Agent reads values from the X, Y, and Z columns of the Field Vec3F table 112.

If any of the fields of the node are SFNode or MFNode, the VRML Agent makes a recursive call to the node generation function using the Node ID as the new World ID.

All VRML information is written to the standard output and is delivered over an HTTP connection to the browser 26. The VRML interpreter 28 in the browser 26 interprets the VRML text and displays an image.

EXPORTING A WORLD FROM DATABASE TO A TEXT FILE

The manager application 14 preferably includes an export function whereby a virtual world stored in a database can be exported to a text file that is managed by the operating system 11. In this way, a virtual world stored in a database can be converted back into conventional VRML text file format and edited using a standard VRML editor. Generally the export function involves carrying out steps of the method of FIG. 4A–4B, and inserting additional ServerRedirect nodes in the output where needed.

When a world is exported, dynamic links in the world to database values are encapsulated in special nodes called ServerRedirect nodes. In this way, dynamic content of the world is maintained when the world is exported, and will be captured when the world is imported again.

INCREMENTALLY DELIVERING A WORLD
DELIVERING SELECTED PORTIONS OF A WORLD

The foregoing discussion describes how an entire VRML world is recomposed and delivered to the browser. However, one embodiment also provides a mechanism for incrementally or selectively delivering a portion of a world to the browser. In the preferred embodiment, the source text of a world is defined with one or more ServerSelector nodes, which enable selective retrieval of the contents of a VRML world. Preferably, each ServerSelector node is defined according to the prototype source code shown in Table 12.

TABLE 12

SERVERSELECTOR NODE

PROTO ServerSelector [field SFString condition "TRUE"
field MFNode children []
]
{
Group {
children IS children
}
}

The ServerSelector node is a grouping node with an additional "condition" field. This field contains a Boolean condition that must evaluate to either TRUE or FALSE.

To selectively generate a world, the world is generated with a value of TRUE specified for a "selective" parameter of the VRML Agent. For example, the VRML Agent is called using a URL with the following form:

http://server_name/vrml/vrml.generate_params_ vrml?world_name=name&param=param_ name&selective=TRUE The "selective=TRUE" parameter indicates that all ServerSelector nodes in the VRML world should be evaluated and conditionally delivered. When selective is set TRUE, the "condition" field of each ServerSelector node is evaluated, and only the nodes whose conditions evaluate to TRUE are actually delivered. When selective is set FALSE, which is the default value, ServerSelector nodes are not evaluated, and all such nodes are delivered to the browser.

The ServerSelector node is used to selectively retrieve the contents of a world. For example, a world is partitioned into logical components, each of which is contained in a distinct ServerSelector node. The partitioned world is selectively retrieved by specifying the component to retrieve in the URL that retrieves the world.

For example, if a world named "huts.wrl" is partitioned into distinct components that represent different components of structures, such as wiring, piping, and walls, the following URLs are used to selectively retrieve structures from within the world:

http://webtest1/vrml/vrml.generate_params_ vrml?world_name=huts&selective=true& component=wall http://webtest1/vrml/vrml.generate_params_ vrml?world_name=huts&selective=true& component=wiring http://webtest1/vrml/vrml.generate_params_ vrml?world_name=huts&selective=true& component=pipes Alternatively, one or more ServerSelector nodes is associated with a region of the world. Each region is defined by x, y, and z coordinate values that are defined in the "condition" field of the ServerSelector node. A desired region is selectively retrieved by specifying the region in the URL that retrieves the world.

SENSING USER MOVEMENT; DELIVERING REGIONS

In another embodiment, a world is divided into one or more regions. A mechanism is provided to track the current virtual location of the browser or user within the virtual world, and to identify when the browser or user has moved into a new region of the world. When such movement is detected, the mechanism generates the new region of the world and provides it to the browser. Thus, the mechanism senses the current position of the user within a virtual world, and delivers only that portion of the virtual world that is near to such current position or visible from such point of view. Using these mechanisms, the user can effectively view only those portions of a large world that are visible to the user based upon the user's point of view or virtual position within the world. As a result, very large worlds can be stored in the database and delivered in pieces to the client, resulting in smooth and efficient navigation through very large data spaces.

In one embodiment, the mechanism is a method having the steps of determining the client's current virtual location in a virtual world; identifying nodes of the virtual world that are within a region near the client or within its field of view; generating a VRML file based upon node information stored in a database, for the identified nodes; delivering the VRML file to the browser; and responding to movement by the client.

In another embodiment, the mechanism involves defining a plurality of proximity sensors in positions spaced apart around the current virtual location of the user. A script is associated with each of the sensors. Each of the scripts defines what action is taken when the proximity sensor is encountered as a result of virtual movement by the user within the world. Each script is associated with a sensor using a route. Each script invokes a client-side mechanism that loads new regions as needed and updates the position values of the sensors. The virtual world is organized as a plurality of regions, each of which is defined by a Selector node. Each Selector node stores an identifier of the region, a location of the region, and child nodes that define visible nodes of the world.

To facilitate the step of determining the client's virtual location in a virtual world, sensor nodes are defined at positions around the user. Preferably, nine sensor nodes are defined, each of which has a region size of one unit on a size, each located in a different position in 3D space with respect to the user. Thus, current position of the client is surrounded at all times by sensor nodes. Movement of the client in any 3D direction causes the movement to be sensed by one of the sensor nodes.

VRML defines a standard node called ProximitySensor that can be used to implement the sensor nodes. Table 13 presents an example sensor node, a script node associated with the sensor node, a route node that connects the sensor node and script node, and a coordinating script called Script1.

TABLE 13

EXAMPLE SENSOR, SCRIPT, AND ROUTE NODES

```
DEF Sen1 ProximitySensor {
    center 100 0 0
    size 80 10 10
}
DEF SenScript1 Script {
    eventIn SFBool start
    eventOut SFInt32 sensorID
    url "vrmlscript: function start(value, ts) {
            if (value == TRUE) {
                sensorID = 1;
            }
        }"
}
DEF Script1 Script {
    eventIn SFInt32 start
    eventIn MFNode nodesIn
    eventOut SFVec3f Sen1Loc
    eventOut SFVec3f Sen2Loc
    eventOut SFVec3f Sen3Loc
    eventOut SFVec3f Sen4Loc
```

TABLE 13-continued

EXAMPLE SENSOR, SCRIPT, AND ROUTE NODES

```
    eventOut MFNode nodesAdd
    eventOut MFNode nodesRemove
    field SFString service http://www.webserver.com/vrml/
        url file ://c:/dlipkin/scale.class
}
ROUTE Sen1.isActive TO SenScript1.start
ROUTE SenScript1.sensorID TO Script1.start
ROUTE Script1.Sen1Loc TO Sen1.set_center
ROUTE Script1.Sen1Loc TO Sen1.set_center
```

In Table 13, a single sensor Sen1 is defined. In the preferred embodiment, a plurality of sensors, at different spatial positions, and associated scripts are defined. The sensor Sen1 is centered at (100,0,0) and has a size of (80,10,10). Each of the sensors is set at a different spatial position with respect to the origin. Each sensor is associated with a script. For example, the sensor Sen1 is associated with the script SenScript1. The script is called when the VRML interpreter 28 in the browser 26 detects that the sensor has been encountered based upon internal mechanisms of VRML that track the client's current position. The script calls a function called start which translates the Boolean event into an integer event identifying which of several possible sensors was fired.

When the script terminates, the ROUTE statements cause control to pass to the Script1 script. The Script1 script calls an external method called "scale" which loads the adjacent region. An example of an implementation of the "scale" method is set forth in Appendix 2.

The ROUTE statements then cause the center of the sensors to be reset to reflect the user's new position in the virtual world.

The step of identifying nodes of a VRML world that are near the client or within its field of view is preferably carried out by providing, in a virtual world source file or in its database representation, "selector" nodes that identify regions and specify the contents of the regions. In the preferred embodiment, each virtual world has a prototype selector node, and one or more instances of the node, in the form shown in Table 14.

TABLE 14

SELECTORNODE PROTOTYPE AND EXAMPLE

```
PROTO OracleSelector [exposedField SFString regionid""
                      field SFString condition "TRUE"
                      field MFNode children []
                     ]
{
Group   {
            children IS children
        }
        AudioClip {description IS regionid}
}
Group   {
        children [
            OracleSelector {
                regionid "Rx0z0"
                condition ":region: = '0,0'"
                children [
                    DEF Rx0z0 SphereCluster {color 1 0 0}
                ]
            }
            /* other Selector nodes and their children are defined here */
        ]
}
```

In this example, the node SphereCluster is defined elsewhere in the virtual world source file, or in an external world. Each Selector node defines a region identifier ("regionid") for the region, and a condition ("condition") which must be true for the client or user to be in that region. The "children" node defines the visible elements of the region.

Generally there will be many Selector nodes in a world source file, or in its representation in the database. The Selector nodes define regions that are separated from one another by one or more units in one or more of the X, Y, or Z directions. Thereafter, a single region of a world can be selectively retrieved using a URL having the following format:

http://webtest1/vrml/vrml.generate_params_vrml?world_name=scale&selective=true&region='1, 1'

In response, the VRML Agent will select and deliver only the region that has X and Y coordinates that match those provided in the URL.

HARDWARE ENVIRONMENT

Figure 6:
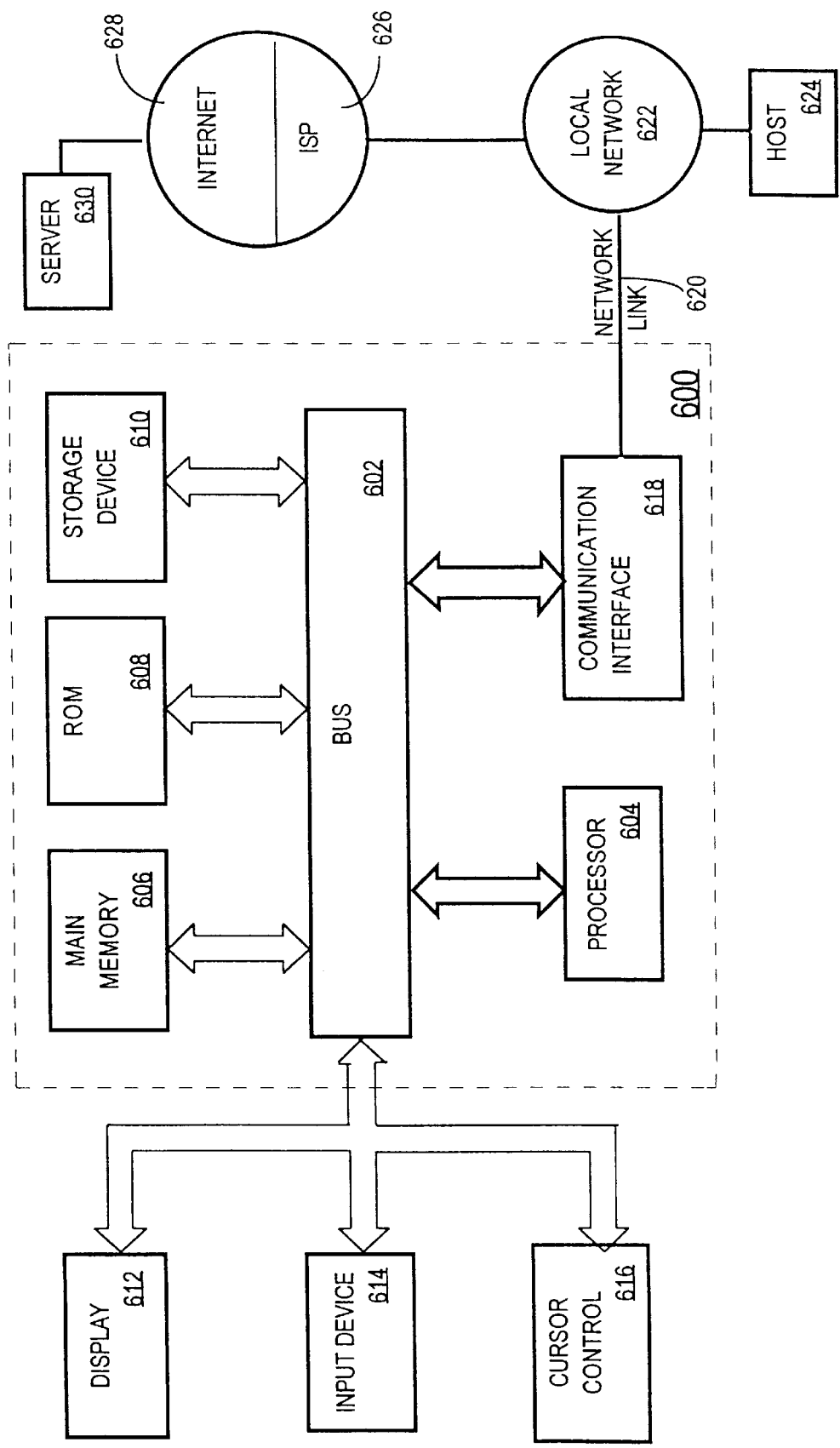
FIG. 6 is a block diagram of a computer system that can be used to implement the invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for dynamically generating a virtual three-dimensional world. According to one embodiment of the invention, dynamically generating a virtual three-dimensional world is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for dynamically generating a virtual three-dimensional world as described herein.

The received code may be executed by processor 604 as it is received, and/or stored in storage device 610, or other non-volatile storage for later execution. In this manner, computer system 600 may obtain application code in the form of a carrier wave.

Thus, flexible methods and mechanisms for storing, dynamically reconstructing, and navigating a three-dimensional virtual world have been described.

In the foregoing specification, the invention has been described with reference to specific embodiments thereof. It will, however, be evident that various modifications and changes may be made thereto without departing from the broader spirit and scope of the invention. For example, certain nodes have been described in terms of specific VRML source code that is the preferred mode of implementing the nodes; however, other functionally equivalent code, in VRML or an equivalent language, can be used and is within the scope of the invention. Further, a database schema has been described as a specific example of one implementation or embodiment of the invention; however, the invention is not limited to that schema or the columns represented in the tables of the schema. Other equivalent data structures and data representations can be used in addition to or in place of the schema. And while the invention has been disclosed in the context of the VRML language, it is not limited to that context; the mechanisms of the invention can be used in the context of any other descriptive language. The specification and drawings are, accordingly, to be regarded in an illustrative rather than restrictive sense.

What is claimed is:

1. A method of generating a display of a virtual world from a first source definition of the virtual world, the method comprising the steps of:
   (A) storing in a database a description of a node that is defined in the first source definition;
   (B) storing in the database, in association with a field value of the node in the description, a statement that describes a database operation;
   (C) executing the statement using the database to generate a data value from the database;
   (D) delivering a second source definition of the virtual world to a client that is configured to generate the display using the second source definition, in which the second source definition uses the data value for the field of the node.

2. The method recited in claim 1, wherein step (B) includes the step of:
   storing, in association with the field value, a Structured Query Language (SQL) statement configured to carry out the database operation on the database.

3. The method recited in claim 1, wherein step (B) further comprises the steps of:

storing a PL/SQL procedure in a server with which the client interacts; and
   storing a PL/SQL function call in association with the field.

4. The method recited in claim 1, wherein step (B) includes the steps of:
   declaring a variable; and
   storing the variable in association with the statement.

5. The method recited in claim 4, wherein step (D) includes the step of:
   providing a value of the variable to the statement when the virtual world is displayed.

6. The method recited in claim 4, wherein step (D) includes the step of:
   providing a value of the variable to the statement when the statement is executed.

7. The method recited in claim 1, further comprising the steps of:
   selecting the field value of the virtual world;
   defining the statement to generate a custom node associated with the field value when the statement is executed; and
   storing the statement in association with the field value.

8. The method recited in claim 7, wherein the step of storing a statement includes the step of:
   defining a PL/SQL procedure configured to generate the custom node; and
   wherein the step of storing the statement includes the step of storing a PL/SQL function call corresponding to the PL/SQL procedure in association with the field value.

9. The method recited in claim 1, further comprising the steps of:
   selecting the field value;
   storing information that identifies a second virtual world in association with the field value.

10. The method recited in claim 9, further comprising the steps of:
    reading a second node from the second virtual world; and
    storing a second node description of the second node in association with the field value.

11. The method recited in claim 10, further comprising the steps of:
    reading a Virtual Reality Modeling Language (VRML) definition of the second node from a source code file; and
    converting the VRML definition into the second node description.

12. The method recited in claim 1, wherein the step of storing a statement comprises the steps of:
    selecting the node, the field value, and an element of the field value;
    defining the statement to yield the data value for the field value when the statement is executed; and
    storing the statement in association with the element.

13. The method recited in claim 12, further comprising the steps of:
    defining a variable parameter in association with the statement; and
    at the client, supplying a variable value to the variable parameter when the second source definition is delivered to the client.

14. A computer-readable medium carrying one or more sequences of one or more instructions for generating a display of a virtual world from a first source definition of the virtual world wherein the execution of the one or more sequences of one or more instructions by one or more processors causes the one or more processors to perform the steps of:

(A) storing in a database a description of a node that is defined in the first source definition;

(B) storing in the database, in association with a field value of the node in the description, a statement that describes a database operation;

(C) executing the statement using the database to generate a data value from the database;

(D) delivering a second source definition of the virtual world to a client that is configured to generate the display using the second source definition, in which the second source definition uses the data value for the field of the node.

15. The computer-readable medium recited in claim 14, wherein step (B) includes the step of:

storing, in association with the field value, a Structured Query Language (SQL) statement configured to carry out the database operation on the database.

16. The computer-readable medium recited in claim 14, wherein step (B) further comprises the steps of:

storing a PL/SQL procedure in a server with which the client interacts; and storing a PL/SQL function call in association with the field.

17. The computer-readable medium recited in claim 14, wherein step (B) includes the steps of:

declaring a variable; and storing the variable in association with the statement.

18. The computer-readable medium recited in claim 14, wherein step (D) includes the step of:

providing a value of the variable to the statement when the virtual world is displayed.

19. The computer-readable medium recited in claim 14, wherein step (D) includes the step of:

providing a value of the variable to the statement when the statement is executed.

20. The computer-readable medium recited in claim 14, further comprising the steps of:

selecting the field value of the virtual world;

defining the statement to generate a custom node associated with the field value when the statement is executed; and storing the statement in association with the field value.

21. The computer-readable medium recited in claim 20, wherein the step of storing a statement includes the step of:

defining a PL/SQL procedure configured to generate the custom node; and wherein the step of storing the statement includes the step of storing a PL/SQL function call corresponding to the PL/SQL procedure in association with the field value.

22. The computer-readable medium recited in claim 14, further comprising the steps of:

selecting the field value;

storing information that identifies a second virtual world in association with the field value.

23. The computer-readable medium recited in claim 22, further comprising the steps of:

reading a second node from the second virtual world; and storing a second node description of the second node in association with the field value.

24. The computer-readable medium recited in claim 23, further comprising the steps of:

reading a Virtual Reality Modeling Language (VRML) definition of the second node from a source code file; and converting the VRML definition into the second node description.

25. The computer-readable medium recited in claim 14, wherein the step of storing a statement comprises the steps of:

selecting the node, the field value, and an element of the field value;

defining the statement to yield the data value for the field value when the statement is executed; and storing the statement in association with the element.

26. The computer-readable medium recited in claim 25, further comprising the steps of:

defining a variable parameter in association with the statement; and at the client, supplying a variable value to the variable parameter when the second source definition is delivered to the client.

27. A computer apparatus for generating a display of a virtual world from a first source definition of the virtual world, the computer apparatus comprising:

a processor; and a memory coupled to the processor; the memory having the first source definition stored therein; and sequences of instructions which, when executed by the processor, cause the processor to generate the display of the virtual world by causing the processor to perform the steps of:

(A) storing in a database a description of a node that is defined in the first source definition;

(B) storing in the database, in association with a field value of the node in the description, a statement that describes a database operation;

(C) executing the statement using the database to generate a data value;

(D) delivering a second source definition of the virtual world to a client that is configured to generate the display using the second source definition, in which the second source definition uses the data value for the field of the node.

28. The computer apparatus recited in claim 27, wherein step (B) includes the step of:

storing, in association with the field value, a Structured Query Language (SQL) statement configured to carry out the database operation on the database.

29. The computer apparatus recited in claim 27, wherein step (B) further comprises the steps of:

storing a PL/SQL procedure in a server with which the client interacts; and storing a PL/SQL function call in association with the field.

30. The computer apparatus recited in claim 27, wherein step (B) includes the steps of:

declaring a variable; and storing the variable in association with the statement.

31. The computer apparatus recited in claim 30, wherein step (D) includes the step of:

providing a value of the variable to the statement when the virtual world is displayed.

32. The computer apparatus recited in claim 30, wherein step (D) includes the step of:

providing a value of the variable to the statement when the statement is executed.

33. The computer apparatus recited in claim 27, in which the memory further comprises instructions that cause the processor to execute the steps of:

selecting the field value of the virtual world;

defining the statement to generate a custom node associated with the field value when the statement is executed; and storing the statement in association with the field value.

34. The computer apparatus recited in claim 33, wherein the step of storing a statement includes the step of:

defining a PL/SQL procedure configured to generate the custom node; and wherein the step of storing the statement includes the step of storing a PL/SQL function call corresponding to the PL/SQL procedure in association with the field value.

35. The computer apparatus recited in claim 27, in which the memory further comprises instructions that cause the processor to execute the steps of:

selecting the field value;

storing information that identifies a second virtual world in association with the field value.

36. The computer apparatus recited in claim 27, in which the memory further comprises instructions that cause the processor to execute the steps of:

reading a second node from the second virtual world; and storing a second node description of the second node in association with the field value.

37. The computer apparatus recited in claim 36, in which the memory further comprises instructions that cause the processor to execute the steps of:

reading a Virtual Reality Modeling Language (VRML) definition of the second node from a source code file; and converting the VRML definition into the second node description.

38. The computer apparatus recited in claim 27, wherein the step of storing a statement comprises the steps of:

selecting the node, the field value, and an element of the field value;

defining the statement to yield the data value for the field value when the statement is executed; and storing the statement in association with the element.

39. The computer apparatus recited in claim 38, in which the memory further comprises instructions that cause the processor to execute the steps of:

defining a variable parameter in association with the statement; and at the client, supplying a variable value to the variable parameter when the second source definition is delivered to the client.

* * * * *